(12) United States Patent
Yamada et al.

(10) Patent No.: US 11,180,333 B2
(45) Date of Patent: Nov. 23, 2021

(54) ULTRASONIC DEVICE

(71) Applicant: Seiko Epson Corporation, Tokyo (JP)

(72) Inventors: Masayoshi Yamada, Chino (JP); Hikaru Iwai, Matsukawa (JP); Kanechika Kiyose, Matsumoto (JP)

(73) Assignee: Seiko Epson Corporation

(*) Notice: Subject to any disclaimer, the term of this patent is extended or adjusted under 35 U.S.C. 154(b) by 211 days.

(21) Appl. No.: 16/527,205

(22) Filed: Jul. 31, 2019

(65) Prior Publication Data
US 2020/0039774 A1 Feb. 6, 2020

(30) Foreign Application Priority Data

| Aug. 1, 2018 | (JP) | ............................. JP2018-144792 |
| Dec. 14, 2018 | (JP) | ............................. JP2018-234127 |

(51) Int. Cl.
| *G01N 29/24* | (2006.01) |
| *G01N 29/04* | (2006.01) |
| *B65H 7/12* | (2006.01) |

(52) U.S. Cl.
CPC ............ *B65H 7/125* (2013.01); *G01N 29/04* (2013.01); *G01N 29/24* (2013.01)

(58) Field of Classification Search
CPC .... G01N 29/11; G01N 29/4427; G01N 29/24; G01N 29/04; G01N 2291/015; G01N 2291/0237; G01N 2553/30; G01N 2291/048; B65H 7/125
USPC .......................................................... 73/632
See application file for complete search history.

(56) References Cited

U.S. PATENT DOCUMENTS

| 9,199,277 B2 * | 12/2015 | Miyazawa ............ B06B 1/0215 |
| 9,921,532 B2 * | 3/2018 | Watanabe .......... G03G 15/5029 |
| 2005/0184453 A1 | 8/2005 | Sano et al. |
| 2014/0027971 A1 | 1/2014 | Fukusaka et al. |
| 2015/0037053 A1 * | 2/2015 | Ishida ................ G03G 15/5029 |
| | | 399/45 |
| 2015/0150533 A1 | 6/2015 | Nakamura et al. |
| 2016/0255225 A1 | 9/2016 | Yamamoto et al. |
| 2017/0057768 A1 * | 3/2017 | Arima ..................... G01N 29/11 |
| 2018/0237240 A1 * | 8/2018 | Sugimoto ............ B65H 3/5253 |
| 2019/0248611 A1 * | 8/2019 | Okazaki ............. G01N 29/4427 |

FOREIGN PATENT DOCUMENTS

| CN | 1626421 A | 6/2005 |
| CN | 203209291 U | 9/2013 |
| JP | 2005-162426 A | 6/2005 |
| JP | 2007-255924 A | 10/2007 |
| JP | 2011-037524 A | 2/2011 |
| JP | 2014-024632 A | 2/2014 |
| JP | 2015-104523 A | 6/2015 |
| JP | 2016-159986 A | 9/2016 |
| JP | 6463920 B2 | 2/2019 |

* cited by examiner

*Primary Examiner* — Jacques M Saint Surin
(74) *Attorney, Agent, or Firm* — Harness, Dickey & Pierce, P.L.C.

(57) ABSTRACT

An ultrasonic device includes an ultrasonic element that performs at least one of transmitting an ultrasonic wave along a first axis and receiving the ultrasonic wave input along the first axis, and a protective member that is provided on the first axis and covers the ultrasonic element, in which the protective member has a plurality of pores through which the ultrasonic wave traveling along the first axis passes.

10 Claims, 26 Drawing Sheets

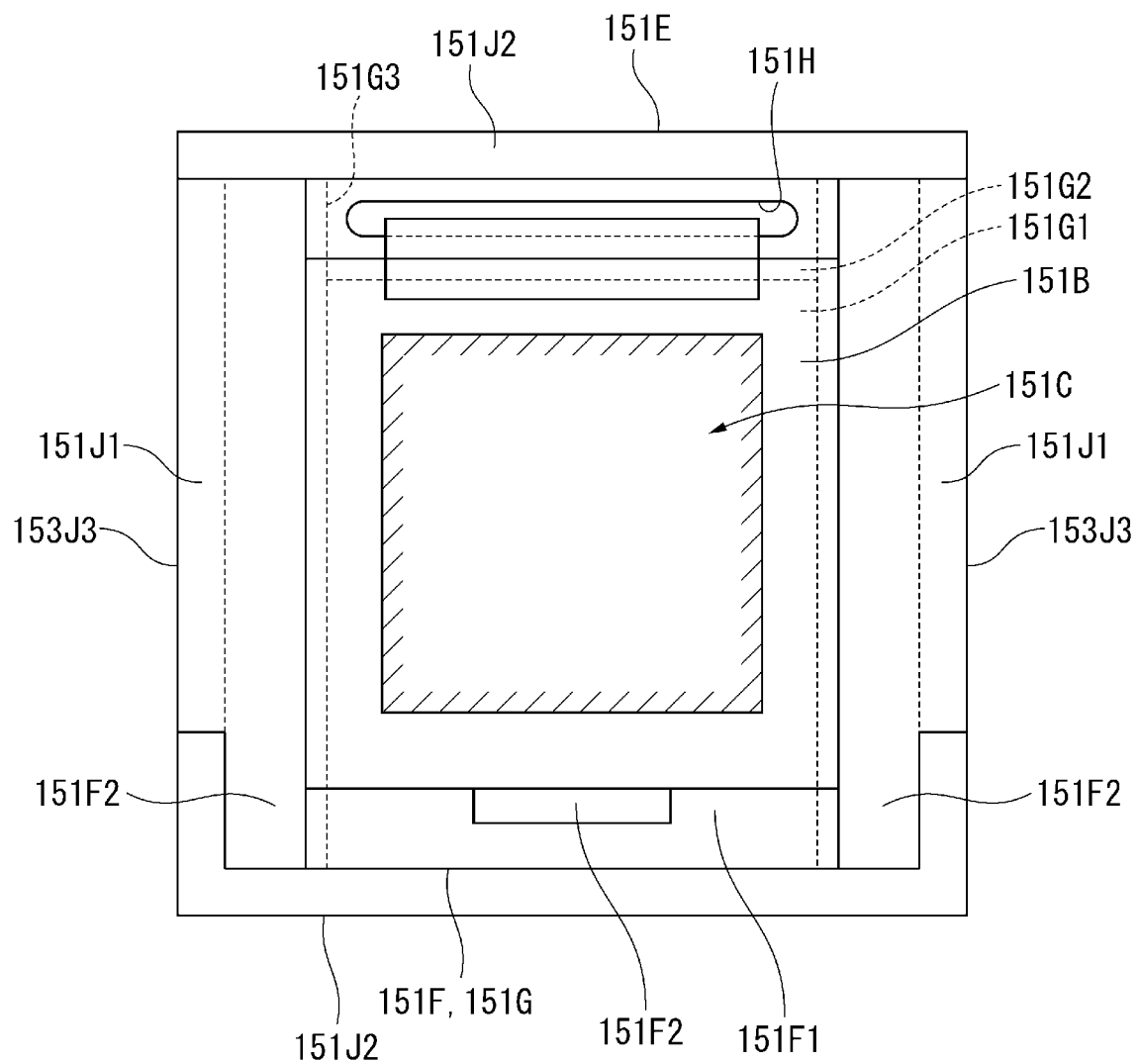
FIG. 28
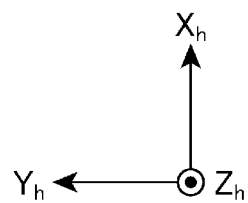

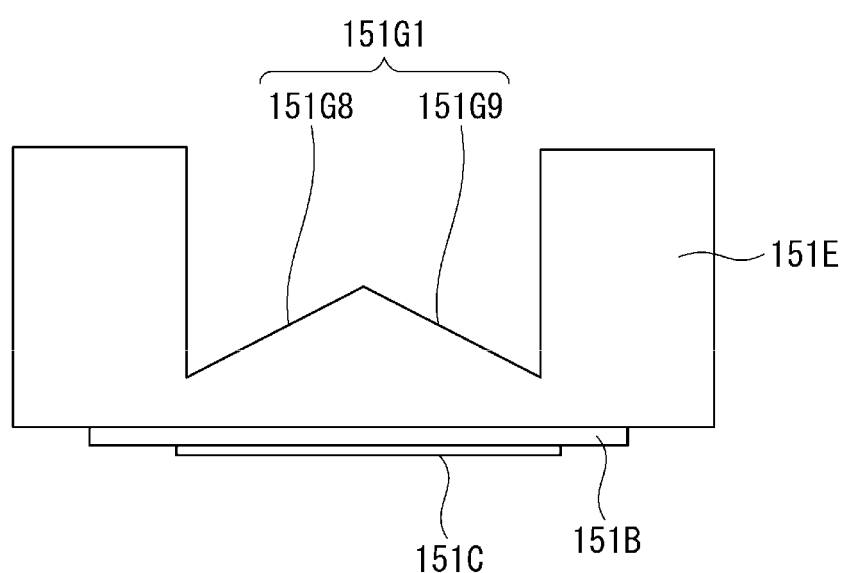
FIG. 30
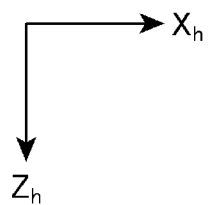

ULTRASONIC DEVICE

The present application is based on, and claims priority from, JP Application Serial Number 2018-144792, filed Aug. 1, 2018 and JP Application Serial Number 2018-234127, filed Dec. 14, 2018, the disclosures of which are hereby incorporated by reference herein in their entirety.

BACKGROUND

1. Technical Field

The present disclosure relates to an ultrasonic device.

2. Related Art

In the related art, an apparatus that detects a state of an object using an ultrasonic wave has been known (for example, see JP-A-2016-159986).

The apparatus disclosed in JP-A-2016-159986 has a multi-feeding sensor that detects multi-feeding of a sheet transported by a sheet transporting apparatus. The multi-feeding sensor includes a transmitter-side sensor unit that transmits an ultrasonic wave such that the ultrasonic wave passes through the sheet and a receiver-side sensor unit that receives the ultrasonic wave having passed through the sheet. A cover member for protecting a circuit board to which the transmitter-side sensor unit is fixed is provided in the multi-feeding sensor disclosed in JP-A-2016-159986.

However, in a multi-feeding sensor disclosed in JP-A-2016-159986, an ultrasonic transmission and reception surface of the multi-feeding sensor cannot be protected. For example, when a paper medium or the like is used as a sheet, foreign substances such as paper dust may occur. When such foreign substances are accumulated on the ultrasonic transmission and reception surface of the multi-feeding sensor, transmission sensitivity and reception sensitivity of the ultrasonic wave are reduced.

SUMMARY

An ultrasonic device according to a first application example includes an ultrasonic element that performs at least one of transmitting an ultrasonic wave along a first axis and receiving the ultrasonic wave input along the first axis; and a protective member that is provided on the first axis and covers the ultrasonic element, in which the protective member has a plurality of pores through which the ultrasonic wave traveling along the first axis passes.

The ultrasonic device according to the application example may further include a substantially cylindrical shielding unit having the first axis as a central axis, in which the ultrasonic element is disposed to be surrounded by a cylindrical inner peripheral surface of the shielding unit, the shielding unit extends along the first axis from a position where the shielding unit surrounds the ultrasonic element, and has a through-hole through which the ultrasonic wave passes, the through-hole being provided at an extension tip end portion, and the protective member is provided to cover the through-hole of the shielding unit.

In the ultrasonic device according to the application example, a sound absorbing unit surrounding the through-hole may be provided on a surface of the extension tip end portion of the shielding unit, which is opposite to the ultrasonic element.

In the ultrasonic device according to the application example, the protective member may be configured by arranging a plurality of wires along a first direction intersecting the first axis and a second direction intersecting the first axis and the first direction, and a normal line of a plane including the first direction and the second direction may be inclined with respect to the first axis.

In the ultrasonic device according to the application example, the normal line of the plane including the first direction and the second direction may be inclined at an angle of 5° or more with respect to the first axis.

In the ultrasonic device according to the application example, the ultrasonic element may perform at least one of transmitting the ultrasonic wave toward an object and receiving the ultrasonic wave input from the object, the first axis may be inclined at a first angle with respect to a normal line of the object, and the normal line of the plane including the first direction and the second direction may be inclined at a second angle that is different from the first angle with respect to the normal line of the object.

In the ultrasonic device according to the application example, the ultrasonic element has a first surface through which the ultrasonic wave is transmitted or received and a second surface that is opposite to the first surface, the ultrasonic device further includes a pedestal portion that holds the ultrasonic element, the pedestal portion includes a third surface which is perpendicular to the first axis and to which the second surface of the ultrasonic element is joined and a fourth surface provided at an opposite side to the third surface, and a normal line of the fourth surface is inclined with respect to the first axis.

In the ultrasonic device according to the application example, the normal line of the fourth surface may be inclined at an angle of 5° or more with respect to the first axis.

In the ultrasonic device according to the application example, a pair of the ultrasonic elements may be provided, and one of the pair of ultrasonic elements may be a transmission unit that transmits the ultrasonic wave and the other of the pair of ultrasonic elements may be a reception unit that receives the ultrasonic wave, and the transmission unit and the reception unit may be provided to face each other on the first axis.

In the ultrasonic device according to the application example, the ultrasonic element receives the ultrasonic wave from the object to output a reception signal, and the ultrasonic device further includes a state detecting unit that detects a state of the object based on the reception signal.

BRIEF DESCRIPTION OF THE DRAWINGS

FIG. 28 is a plan view showing the configuration of the transmission pedestal portion according to the modification example 5.

FIG. 30 is a schematic view showing another example of an inclined end surface of the transmission pedestal portion according to the modification example 5.

DESCRIPTION OF EXEMPLARY EMBODIMENTS

First Embodiment

Hereinafter, the first embodiment will be described.

Figure 1:
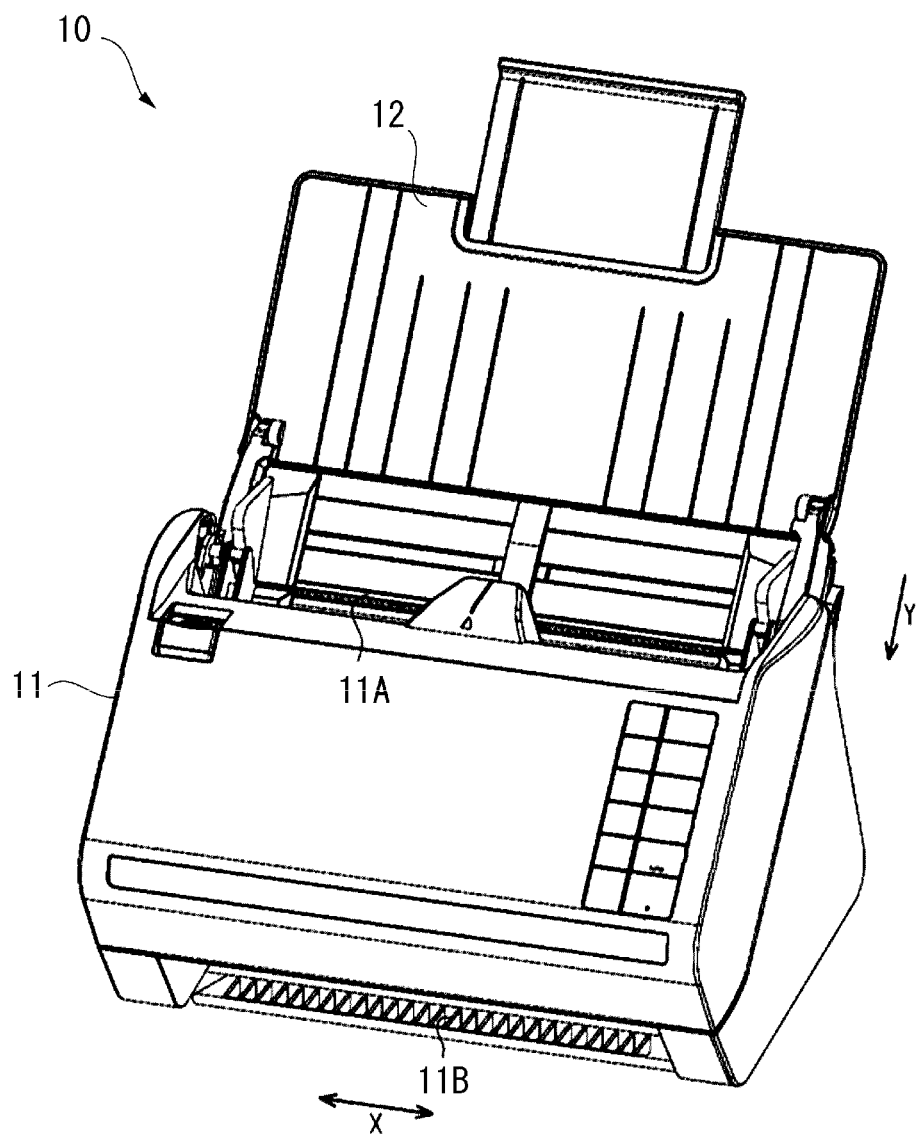
FIG. 1 is a view showing a schematic external configuration of an image scanner according to a first embodiment.
Figure 2:
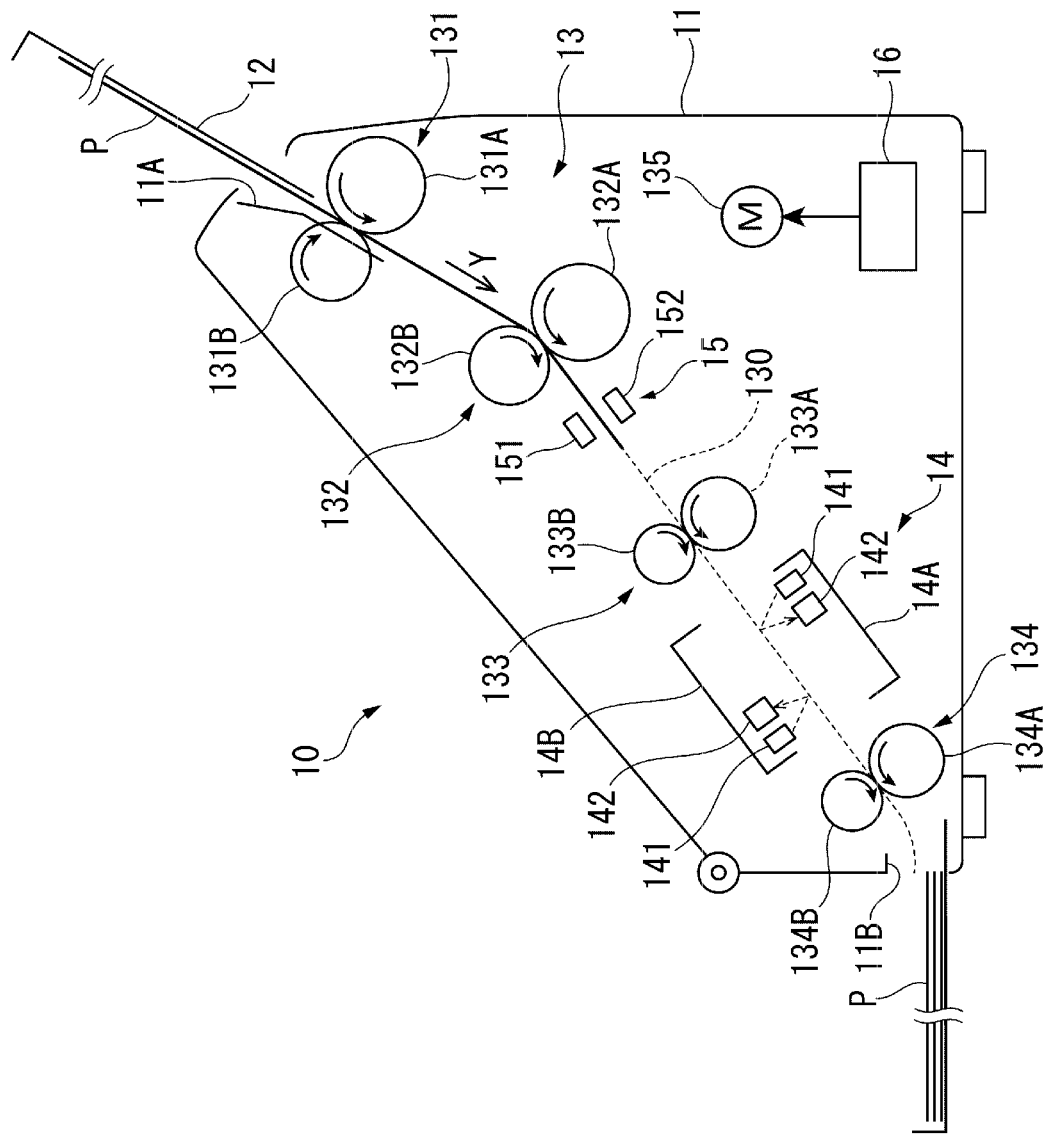
FIG. 2 is a side sectional view showing an outline of a transporting unit of the image scanner according to the present embodiment.

FIG. 1 is a view showing a schematic external configuration of an image scanner 10 according to a first embodiment. FIG. 2 is a side sectional view showing an outline of a transporting unit of the image scanner 10. FIG. 2 is a side sectional view of the image scanner 10 when viewed from a main scanning direction (an X direction) perpendicular to a transport direction (a Y direction).

Schematic Configuration of Image Scanner 10

The image scanner 10 is an example of an electronic device. As shown in FIG. 1, the image scanner 10 includes a main apparatus body 11 and a paper sheet support 12. As shown in FIG. 2, a transport unit 13 that transports a paper sheet P, a scanning unit 14 that reads an image of the transported paper sheet P, an ultrasonic sensor 15 that detects multi-feeding of the paper sheet P, and a controller 16 that controls the image scanner 10 are provided inside the main apparatus body 11. Although an example in which the ultrasonic sensor 15 detects the multi-feeding of the paper sheet P with the paper sheet P as an object is shown in the present embodiment, the present disclosure is not limited thereto. Examples of the object may include various media such as a film and a fabric.

As shown in FIGS. 1 and 2, a feeding port 11A is provided at a connection position between the main apparatus body 11 and the paper sheet support 12. The paper sheet P placed on the paper sheet support 12 is fed to the feeding port 11A one by one. The fed paper sheet P is transported along a predetermined transport passage 130 in the main apparatus body 11 by the transport unit 13. Thus, after an image is read by the scanning unit 14 at a reading position during the transport, the paper sheet P is discharged from a discharge port 11B open to a front lower side of the main apparatus body 11.

Configuration of Transport Unit 13

The transport unit 13 transports a plurality of paper sheets P set on the paper sheet support 12 one by one in the transport direction (the Y direction). That is, the transport unit 13 transports the paper sheet P sent from the feeding port 11A while guiding the paper sheet P to the main apparatus body 11, and transports the fed paper sheet P along the predetermined transport passage 130.

In more detail, the transport unit 13 includes a first feeding roller pair 131 disposed upstream (a −Y side) of the transport passage 130 in the Y direction and a second feeding roller pair 132 disposed downstream (a +Y side) of the first feeding roller pair 131 in the Y direction. Further, the transport unit 13 includes a first transport roller pair 133 disposed on the −Y side and a second transport roller pair 134 dispose on +Y side with the reading position of the paper sheet P interposed therebetween.

The first feeding roller pair 131 includes a first driving roller 131A and a first driven roller 131B. Similarly, the second feeding roller pair 132 includes a first driving roller 132A and a second driven roller 132B. Further, the first transport roller pair 133 includes a third driving roller 133A and a third driven roller 133B. Similarly, the second transport roller pair 134 includes a fourth driving roller 134A and a fourth driven roller 134B. The driven rollers 131B to 134B are driven (rotated together) by rotation of the corresponding driving rollers 131A to 134A, respectively.

The driving rollers 131A to 134A constituting the roller pairs 131 to 134 are rotationally driven by power of a transport motor 135 that is a power source thereof. The transport motor 135 is controlled by the controller 16, and drives the driving rollers 131A to 134A.

Further, the second driven roller 132B constituting the second feeding roller pair 132 is a retard roller. A frictional coefficient of an outer peripheral surface of the second driven roller 132B against the paper sheet P is larger than a frictional coefficient of an outer peripheral surface of the second driving roller 132A against the paper sheet P. Therefore, the second feeding roller pair 132 functions as a separation mechanism that separates the paper sheet P one by one and sends the separated paper sheet P to the +Y side. Thus, for example, a plurality of paper sheets P placed on the paper sheet support 12 by rotation of the first feeding roller pair 131 are fed one by one from the uppermost sheet from the feeding port 11A into the main apparatus body 11 in order. Further, the paper sheets P are separated one by one by rotation of the second feeding roller pair 132, and are fed to the +Y side.

Configuration of Scanning Unit 14

As shown in FIG. 2, the scanning unit 14 is provided at the reading position where an image of the paper sheet P is read, between the first transport roller pair 133 and the second transport roller pair 134 of the transport passage 130.

The scanning unit 14 includes a first scanning unit 14A and a second scanning unit 14B provided at both sides of the transport passage 130. The scanning unit 14 includes a light source 141 that can emit a light beam to the paper sheet P being transported and an image sensor 142 that extends in a main scanning direction (the X direction). In a normal reading mode in which the surface of the paper sheet P is read, the first scanning unit 14A performs a reading operation. In a double-sided reading mode in which the front and rear surfaces of the paper sheet P are read, the first scanning unit 14A and the second scanning unit 14B perform the reading operation together. The light source 141 and the image sensor 142 constituting the first scanning unit 14A or the second scanning unit 14B are connected to the controller 16 and perform scanning processing of reading the image of the paper sheet P under a control of the controller 16.

Configuration of Ultrasonic Sensor 24

The ultrasonic sensor 15 is provided between the second feeding roller pair 132 and the first transport roller pair 133, in the transport passage 130. The ultrasonic sensor 15, which is a multi-feeding sensor, detects the multi-feeding of the paper sheet P being transported by the transport unit 13.

Figure 3:
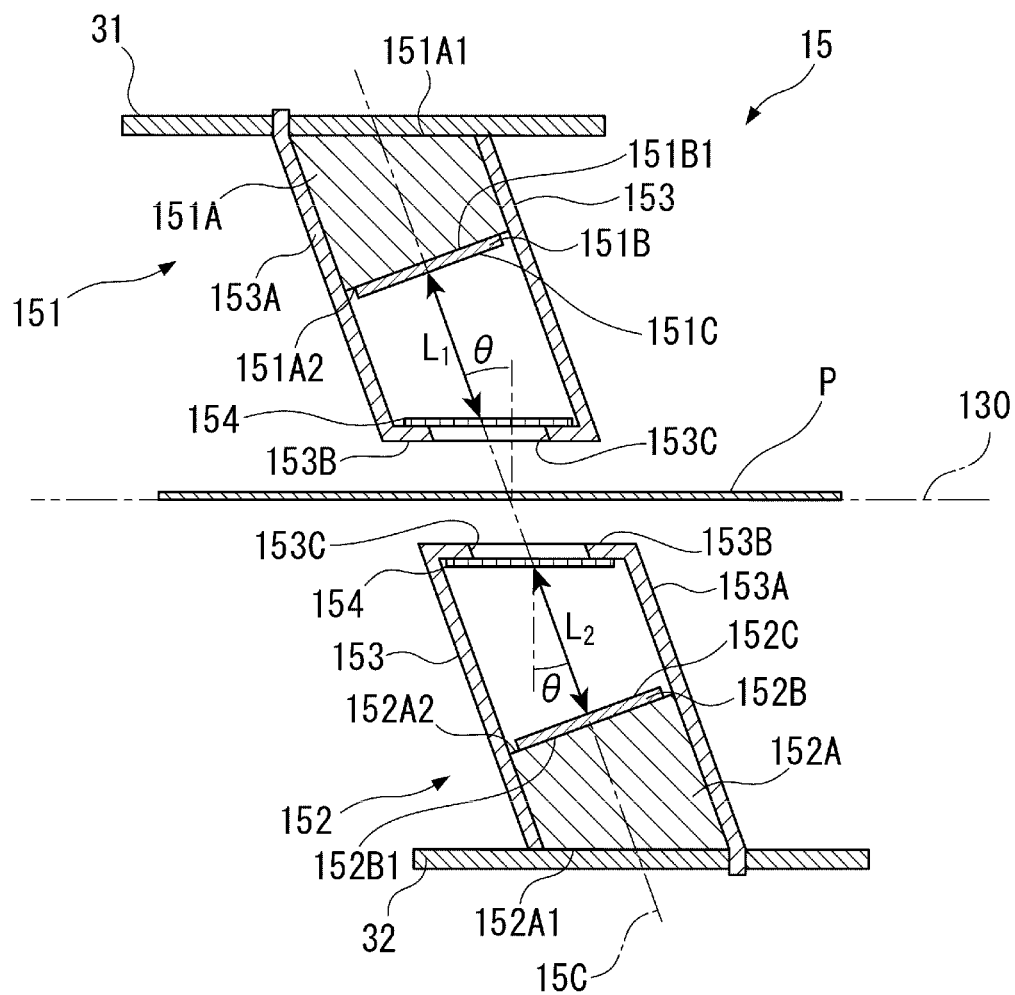
FIG. 3 is a sectional view showing a schematic configuration of an ultrasonic sensor according to the present embodiment.

FIG. 3 is a sectional view showing a schematic configuration of the ultrasonic sensor 15. FIG. 3 is a sectional view of the ultrasonic sensor 15 when viewed from the Y direction.

The ultrasonic sensor 15 includes a pair of ultrasonic elements. One of the pair of ultrasonic elements, which is a transmission unit 151, transmits an ultrasonic wave. The other of the pair of ultrasonic elements, which is a reception unit 152, receives an ultrasonic wave.

As shown in FIG. 3, the transmission unit 151 and the reception unit 152 face each other on a sensor center axis 15C (a first axis), and are arranged with the transport passage 130, through which the paper sheet P is transported, interposed therebetween.

The ultrasonic sensor 15 transmits an ultrasonic wave from the transmission unit 151 to the paper sheet P transported along the transport passage 130 by the transport unit 13. The ultrasonic wave transmitted from the transmission unit 151 is input to the paper sheet P, and the reception unit 152 receives the ultrasonic wave having passed through the paper sheet P. When the reception unit 152 receives the ultrasonic wave, a reception signal is output according to the sound pressure of the ultrasonic wave received from the reception unit 152, and the multi-feeding of the paper sheet P is detected based on the intensity of the reception signal.

As shown in FIG. 3, the sensor center axis 15C is an axis passing through the center of the transmission unit 151 and the center of the reception unit 152, and serves as a transmission and reception direction of the ultrasonic wave. In the present embodiment, the sensor center axis 15C is inclined at a first angle $\theta$ with respect to a normal line of the surface of the paper sheet P transported along the transport passage 130.

When the sensor center axis 15C coincides with a normal direction of the surface of the paper sheet P, there is a concern that the ultrasonic wave transmitted from the transmission unit 151 is multi-reflected between the paper sheet P and the transmission unit 151. Further, there is a concern that the ultrasonic wave having passed through the paper sheet P is multi-reflected between the reception unit 152 and the paper sheet P. In this case, in the reception unit 152, the reception unit 152 receives the ultrasonic wave multi-reflected between the paper sheet p and the transmission unit 151 and the ultrasonic wave multi-reflected between the reception unit 152 and the paper sheet P in addition to the ultrasonic wave passing through the paper sheet P from the transmission unit 151 and received by the reception unit 152. Thus, the multi-feeding cannot be performed accurately.

In contrast, as the sensor center axis 15C is inclined with respect to a normal line of the surface of the paper sheet P, it is possible to reduce reception of unnecessary ultrasonic components such as the multi-reflected ultrasonic wave, and it is possible to detect the multi-feeding at high accuracy.

Further, a shielding unit 153 and a protective member 154 are provided in the transmission unit 151 and the reception unit 152, respectively. The shielding unit 153 and the protective member 154 are members for protecting the transmission unit 151 and the reception unit 152 that are ultrasonic elements. Details of the shielding unit 153 and the protective member 154 will be described below.

Configuration of Transmission Unit 151 and Reception Unit 152

The transmission unit 151 includes a transmission pedestal portion 151A and a main transmission body unit 151B, and is attached to a transmission circuit board 31. The transmission circuit board 31 is fixedly disposed in the main apparatus body 11 to be parallel to the transport passage 130.

In the transmission pedestal portion 151A, a proximal end-side end surface 151A1 (a fourth surface) is fixed to the transmission circuit board 31, and a tip end-side end surface 151A2 (a third surface) opposite to the proximal end-side end surface 151A1 is inclined at the first angle $\theta$ with respect to the proximal end-side end surface 151A1. Thus, as the main transmission body unit 151B is fixed to the tip end-side end surface 151A2, an ultrasonic wave transmission surface 151C of the transmission unit 151 is fixed at an angle that is perpendicular to the sensor center axis 15C. Here, the transmission surface 151C of the main transmission body unit 151B corresponds to a first surface that transmits the ultrasonic wave, and a surface (a transmission-side fixed surface 151B1) fixed to the transmission pedestal portion 151A of the main transmission body unit 151B corresponds to a second surface on an opposite side to the first surface. The transmission-side fixed surface 151B1 of the main transmission body unit 151B is joined to the tip end-side end surface 151A2, which is a third surface, through adhesive, a double-sided tape, or the like.

The main transmission body unit 151B is an ultrasonic element that transmits an ultrasonic wave along the sensor center axis 15C. Detailed configurations of the main transmission body unit 151B will be described below.

The reception unit 152 has the same configuration as that of the transmission unit 151. That is, the reception unit 152 includes a reception pedestal portion 152A and a main reception body unit 152B, and is fixed to a reception circuit board 32. The reception circuit board 32 is fixedly disposed in the main apparatus body 11 to be parallel to the transport passage 130.

In the reception pedestal portion 152A, a proximal end-side end surface 152A1 is fixed to the reception circuit board 32, and the tip end-side end surface 152A2 opposite to the proximal end-side end surface 152A1 is inclined at the first angle θ with respect to the proximal end-side end surface 152A1. Thus, as the main reception body unit 152B is fixed to the tip end-side end surface 152A2, an ultrasonic wave reception surface 152C of the reception unit 152 is fixed at an angle that is perpendicular to the sensor center axis 15C. Here, the reception surface 152C of the main reception body unit 152B corresponds to a first surface that receives the ultrasonic wave, and a surface (a reception-side fixed surface 152B1) fixed to the reception pedestal portion 152A of the main reception body unit 152B corresponds to a second surface on an opposite side to the first surface. The reception-side fixed surface 152B1 of the main reception body unit 152B is joined to the tip end-side end surface 152A2, which is a third surface, through adhesive, a double-sided tape, or the like.

The main reception body unit 152B is an ultrasonic element that receives an ultrasonic wave input along the sensor center axis 15C.

Although an example where the transmission circuit board 31 and the reception circuit board 32 are provided independently of each other is shown in the present embodiment, the present disclosure is not limited thereto. The transmission circuit board 31 and the reception circuit board 32 may be integrally configured on one board. Further, at least one of the transmission circuit board 31 and the reception circuit board 32 may be configured with a plurality of boards.

Detailed Configuration of Main Transmission Body Unit 151B

Next, the configuration of the main transmission body unit 151B will be described in more detail. The main reception body unit 152B has the same configuration as the main transmission body unit 151B. Therefore, the detailed configuration of the main reception body unit 152B will be omitted.

Figure 4:
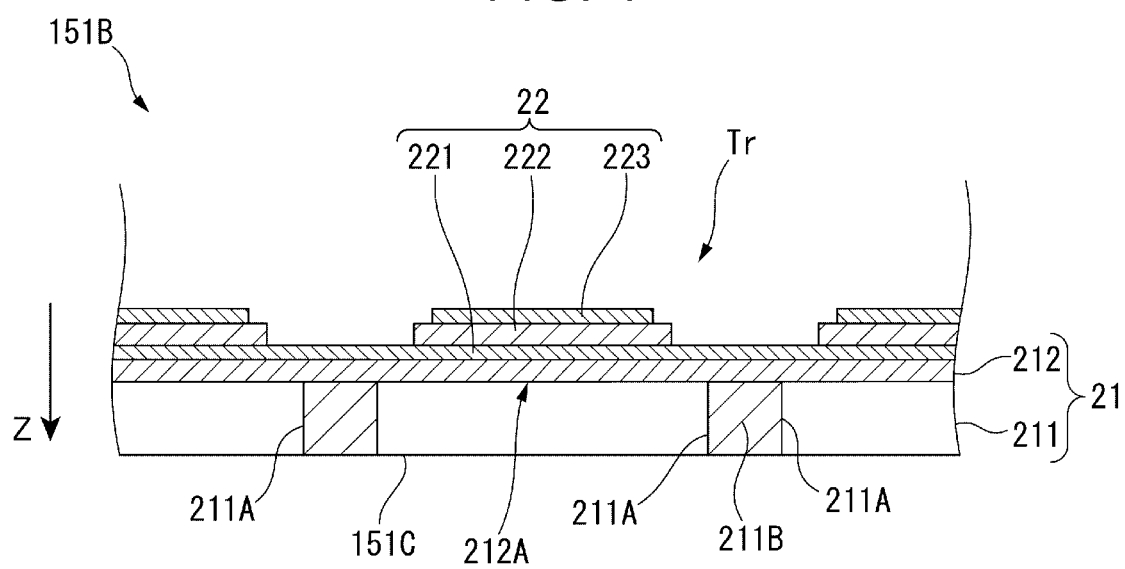
FIG. 4 is a schematic sectional view showing apart of a main transmission body unit according to the present embodiment.

FIG. 4 is a sectional view showing a part of the main transmission body unit 151B.

As shown in FIG. 4, the main transmission body unit 151B includes an element substrate 21 and a piezoelectric element 22.

The element substrate 21 includes a main substrate body portion 211 and a vibration plate 212 provided at one surface side of the main substrate body portion 211. Here, in the following description, the substrate thickness direction of the element substrate 21 is set as a Z direction. The Z direction, in which the ultrasonic wave is transmitted, is parallel to the sensor center axis 15C.

The main substrate body portion 211, which is a substrate for supporting the vibration plate 212, is configured with a semiconductor substrate made of Si, or the like. The main substrate body portion 211 is provided with an opening portion 211A that penetrates the main substrate body portion 211 along the Z direction.

The vibration plate 212 is configured with a laminate made of $SiO_2$ or $SiO_2$ and $ZrO_2$, and is provided at a −Z side of the main substrate body portion 211. The vibration plate 212 is supported by a partition wall 211B of the main substrate body portion 211, which constitutes the opening portion 211A, and closes the opening portion 211A on the −Z side. A portion of the vibration plate 212, which overlaps with the opening portion 211A when viewed from the Z direction, constitutes a vibration unit 212A.

The piezoelectric element 22 is provided on the vibration plate 212 at a position where the piezoelectric element 22 overlaps with each vibration unit 212A when viewed from the Z direction. As shown in FIG. 4, the piezoelectric element 22 is configured by sequentially laminating a first electrode 221, a piezoelectric film 222, and a second electrode 223 on the vibration plate 212.

Here, one ultrasonic transducer Tr is configured with one vibration unit 212A and the piezoelectric element 22 provided on the vibration unit 212A. Although not shown, in the present embodiment, the main transmission body unit 151B is configured by arranging such an ultrasonic transducer Tr in a two-dimensional array structure.

The main transmission body unit 151B applies a pulse wave voltage having a predetermined frequency between the first electrode 221 and the second electrode 223 of the ultrasonic transducer Tr, so that the piezoelectric film 222 is expanded and contracted. Accordingly, the vibration unit 212A vibrates at a frequency according to an opening width or the like of the opening portion 211A, so that the ultrasonic wave is transmitted from the vibration unit 212A along the sensor center axis 15C toward the +Z side. That is, the surface of the element substrate 21 on the +Z side serves as the ultrasonic wave transmission surface 151C of the transmission unit 151.

As described above, the main reception body unit 152B has the same configuration as the main transmission body unit 151B, and is configured by vertically reversing the main transmission body unit 151B shown in FIG. 4. That is, in the main reception body unit 152B, the vibration plate 212 is disposed on the +Z side of the main substrate body portion 211, and the piezoelectric element 22 is disposed on the +Z side of the vibration plate 212. However, in the main reception body unit 152B, a surface of the element substrate 21 on the −Z side in which the vibration plate 212 is not provided is set as the reception surface 152C, which receives an ultrasonic wave input from the −Z side toward the +Z side. In the main reception body unit 152B, when the ultrasonic wave is input from the opening portion 211A along the sensor center axis 15C, the vibration plate 212A vibrates. Accordingly, a potential difference occurs between the first electrode 221 side and the second electrode 223 side of the piezoelectric film 222, and a reception signal corresponding to the potential difference is output from the main reception body unit 152B.

Configurations of Shielding Unit 153 and Protective Member 154

As shown in FIG. 3, the shielding unit 153 is provided in each of the transmission unit 151 and the reception unit 152. The shielding unit 153 is made of a conductive member such as metal, and protects the main transmission body unit 151B and the main reception body unit 152B from static electricity and electromagnetic waves.

The shielding unit 153 has a substantially cylindrical shielding wall 153A of which the central axis is set to the sensor center axis 15C, is fixed to a circuit board on a proximal end side thereof, and extends toward the transport passage 130 side.

That is, the shielding unit 153 provided at the transmission unit 151 side is fixed to the transmission circuit board 31 on the proximal end side thereof, and extends toward the transport passage 130 side (the paper sheet P side) while taking the sensor center axis 15C as the central axis. Thus, the transmission pedestal portion 151A and the main transmission body unit 151B are disposed to be surrounded by a cylindrical inner circumferential surface of the cylindrical shielding wall 153A of the shielding unit 153.

Similarly, the shielding unit 153 provided at the reception unit 152 side is fixed to the reception circuit board 32 on the proximal end side thereof, and extends toward the transport passage 130 side (the paper sheet P side) while taking the sensor center axis 15C as the central axis. Thus, the reception pedestal portion 152A and the main reception body unit 152B are disposed to be surrounded by a cylindrical inner circumferential surface of the cylindrical shielding wall 153A of the shielding unit 153.

Further, the shielding unit 153 has a protrusion portion 153B protruding from the shielding wall 153A toward the sensor center axis 15C, at an end portion of the shielding wall 153A on the transport passage 130 side. The protrusion portion 153B is provided with a through-hole 153C, through which the ultrasonic wave passes, at a position where the through-hole 153C intersects the sensor center axis 15C. That is, the shielding unit 153 on the transmission unit 151 side extends from a position where the shielding unit 153 surrounds the transmission pedestal portion 151A and the main transmission body unit 151B to a side where the shielding unit 153 approaches the transport passage 130 through which the paper sheet P is transported. The shielding unit 153 has the through-hole 153C at a tip extension end portion thereof, through which the ultrasonic wave transmitted from the main transmission body unit 151B passes. Further, the shielding unit 153 on the reception unit 152 side extends from a position where the shielding unit 153 surrounds the reception pedestal portion 152A and the main reception body unit 152B to a side where the shielding unit 153 approaches the transport passage 130 through which the paper sheet P is transported. The shielding unit 153 has the through-hole 153C at a tip extension end portion thereof, through which the ultrasonic wave received by the main reception body unit 152B passes.

In the present embodiment, as shown in FIG. 3, the protrusion portion 153B is configured to have a plate shape that is parallel to the transport passage 130. That is, a normal line of the protrusion portion 153B is inclined at the first angle θ with respect to the sensor center axis 15C.

Thus, the protective member 154 is provided in the protrusion portion 153B of the shielding unit 153 so as to cover the through-hole 153C.

Figure 5:
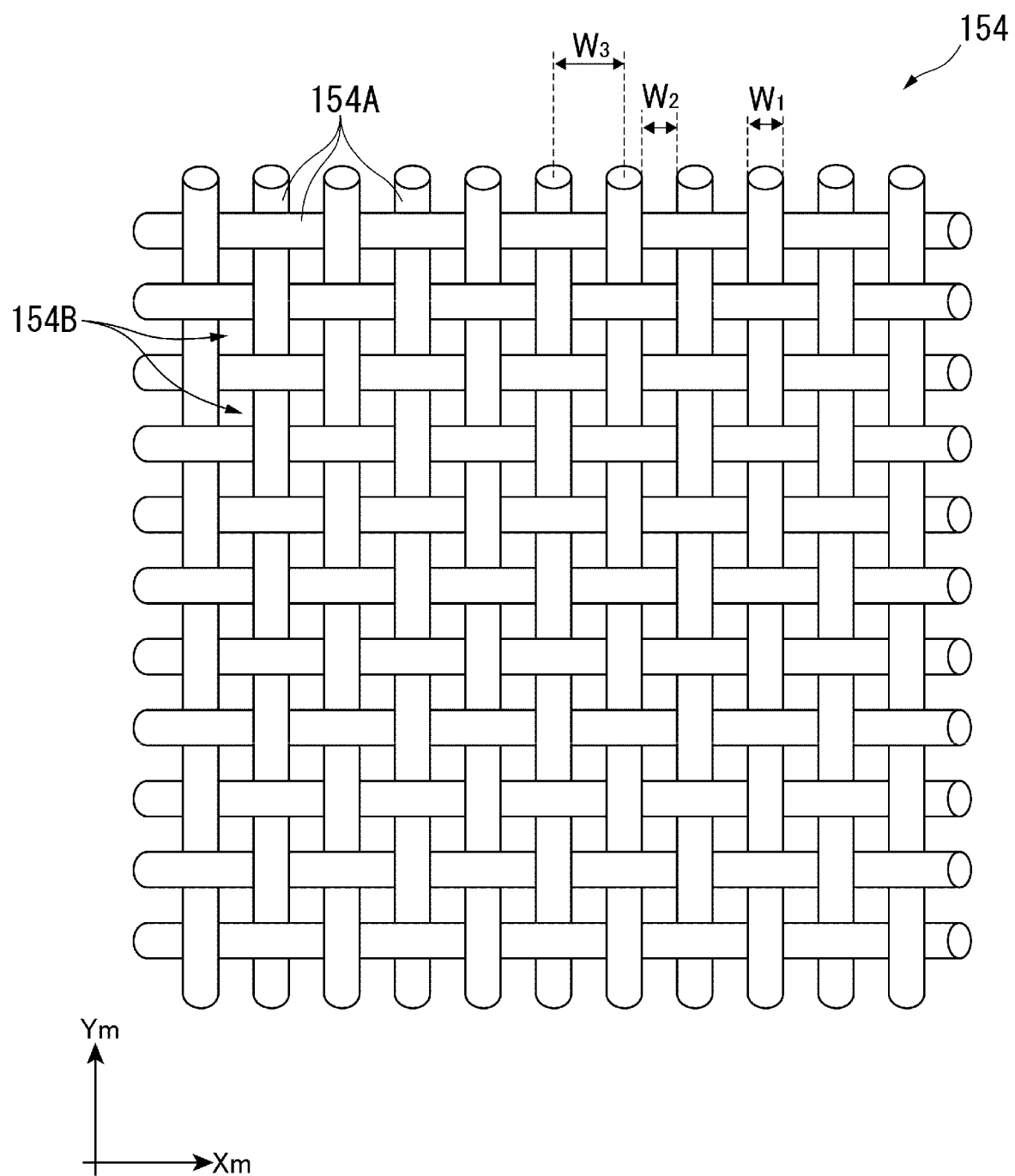
FIG. 5 is a view showing a schematic configuration of a protective member according to the present embodiment.

FIG. 5 is a view showing a schematic configuration of the protective member 154 according to the present embodiment. In FIG. 5, an Xm direction (a first direction) and an Ym direction (a second direction) intersect each other with respect to the sensor center axis 15C, and a normal line of an XmYm plane is inclined at the first angle θ with respect to the sensor center axis 15C. In the following description, the normal line of the XmYm plane may be referred to as the normal line of the protective member 154.

The protective member 154 is a mesh-type filter by arranging a plurality of wires 154A, a line direction of which is the Xm direction, along the Ym direction and arranging a plurality of wires 154A, a line direction of which is the Ym direction, along the Xm direction. Although an example where the Xm direction and the Ym direction intersect each other at 90 degrees is shown in FIG. 5, the present disclosure is not limited thereto. An angle between the Xm direction and the Ym direction may be an angle other than 90 degrees.

Examples of a material of the wires 154A include a metal material or alloy material such as copper, iron, brass, and SUS and a synthetic resin such as nylon and polyester. In particular, it is preferable to use a material having conductivity, in which case resistance to static electricity and electromagnetic waves can be obtained.

Further, it is preferable that a wire diameter $W_1$ of the wires 154A is less than the wavelength of the ultrasonic wave. Accordingly, inconvenience is suppressed that the ultrasonic wave is irregularly reflected by the wires 154A of the protective member 154.

In such a protective member 154, an air gap 154B surrounded by a pair of wires 154A adjacent to each other in the Xm direction and a pair of wires 154A adjacent to each other in the Ym direction is formed. The air gap 154B corresponds to a hole through which the ultrasonic wave traveling along the sensor center axis 15C passes from the transmission unit 151 side to the reception unit 152 side. In the present embodiment, it is preferable that in order to suppress adhesion and accumulation of foreign substances such as paper dusts to and from the transmission surface 151C and the reception surface 152C, the width of the air gap 154B, that is, a distance (an opening W2) between the adjacent wires 154A, is equal to or less than 1 mm.

Further, a distance between central axes of the wires 154A is referred to as a pitch W3, and a porosity S is defined by Equation (1).

$$S = 100 \times (W_2/W_3)^2 \qquad (1)$$

In the present embodiment, it is preferable that the porosity S is equal to or more than 20%.

When the ultrasonic sensor 15 detects the multi-feeding of the paper sheet P, it is determined whether the ultrasonic wave having passed through the paper sheet P is detected by the main reception body unit 152B. That is, it is necessary that the ultrasonic wave transmitted from the main transmission body unit 151B passes through the protective member 154 of the transmission unit 151, the paper sheet P, and the protective member 154 of the reception unit 152, and is input to the main reception body portion 152B. In this case, it is preferable that in order to suppress a decrease in a sound pressure of the ultrasonic wave received by the main reception body unit 152B, a sound transmittance of each protective member 154 is equal to or more than 50%.

Here, when the porosity S is less than 20%, the sound transmittance is less than 50%. Therefore, even when the paper sheet P is not double-fed to the transport passage 130, the sound pressure of the ultrasonic wave received by the main reception body unit 152B is reduced, and the intensity of the reception signal is reduced. In this case, it is difficult to distinguish the reception signal from noise, and it is impossible to accurately detect the multi-feeding.

In contrast, when the porosity S is equal to or more than 20%, the sound transmittance is equal to or more than 50%. Even when the ultrasonic wave passes through the two protective members 154, it is possible to suppress an excessive decrease in the sound pressure and to detect the multi-feeding by the ultrasonic sensor 15.

Thus, in the present embodiment, the above-described protective member 154 is provided to cover the through-hole 153C of the shielding unit 153. The protective member 154 is adhesively fixed to a surface of the protrusion portion 153B of the shield portion 153 on the ultrasonic element side through an adhesive or the like. That is, when the paper sheet P is transported to a position of the ultrasonic sensor 15, the protective member 154 is disposed between the transmission unit 151 and the paper sheet P or between the reception unit 152 and the paper sheet P.

As described above, the normal line of the protrusion portion 153B of the shielding unit 153 is inclined at the first angle θ with respect to the sensor center axis 15C. Therefore, the normal line of the protective member 154 fixed to the protrusion portion 153B, that is, a normal line of the XmYm plane, is also inclined at the first angle θ with respect to the sensor center axis 15C.

Configuration of Suppressing Multiple Reflection of Ultrasonic Wave

Figure 6:
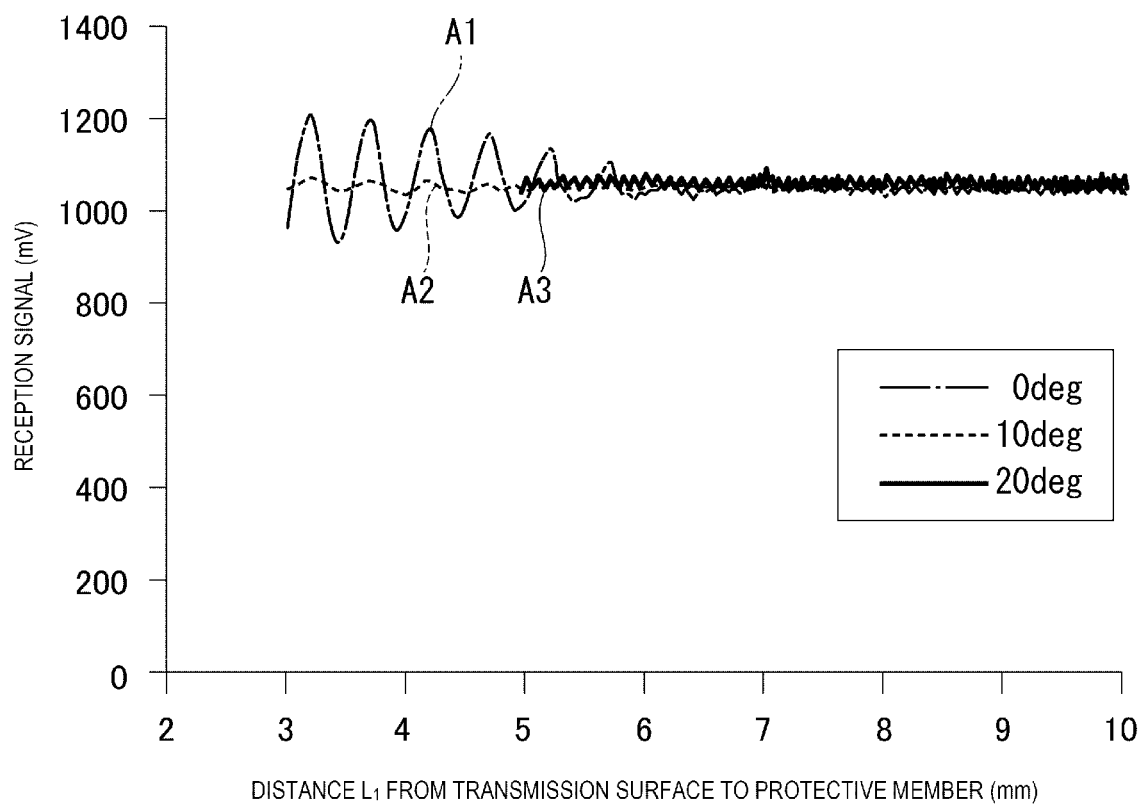
FIG. 6 is a graph depicting a change in a voltage value of a reception signal when a distance between a transmission unit and the protective member changes, in a plurality of patterns having different angles of a normal line of the protective member with respect to a sensor center axis.

FIG. 6 is a graph depicting a change in a voltage value of a reception signal when a distance $L_1$ between the transmission surface 151C of the transmission unit 151 and the protective member 154 changes, in a plurality of patterns having different angles of a normal line of the protective member 154 with respect to the sensor center axis 15C. In FIG. 6, an angle between the normal line of the protective member 154 and the sensor center axis 15C is changed to three patterns of 0°, 10°, and 20°. In each case, a reception voltage of a reception signal output from the main reception body unit 152B when the distance L1 from the transmission surface 151C to the protective member 154 is changed between 3 mm to 10 mm is shown.

In FIG. 6, a signal A1 is a reception signal when the normal line of the protective member 154 and the sensor center axis 15C are parallel to each other. A signal A2 is a reception signal when the first angle θ between the normal line of the protective member 154 and the sensor center axis 15C is 10°. A signal A3 is a reception signal when the first angle θ between the normal line of the protective member 154 and the sensor center axis 15C is 20°.

Although display of the signal A3 when the distance $L_1$ is changed from 3 mm to 5 mm is omitted in consideration of visibility of the signal A2, the same waveform that is equal to or more than 5 mm is obtained.

In a case where the normal line of the protective member 154 and the sensor center axis 15C are parallel to each other, as indicated by the signal A1 of FIG. 6, when the distance $L_1$ from the transmission surface 151C to the protective member 154 is changed, a voltage value (a reception voltage) of the reception signal greatly fluctuates. That is, when a relationship between the distance $L_1$ from the transmission surface 151C to the protective member 154 and the wavelength λ of the ultrasonic wave is L1=m×λ/2 (wherein m is an integer), the ultrasonic wave is intensified due to a multiple reflection component. Further, when a relationship between the distance $L_1$ and the wavelength λ of the ultrasonic wave is L1={(2m+1)/4}×λ, the ultrasonic wave is weakened due to the multiple reflection component.

In this way, this means that when the distance $L_1$ is changed, if variation in the voltage value of the reception signal increases, the reception unit 152 receives the multiple reflection component of the ultrasonic wave. In such a case, a noise component caused by the multi-reflected ultrasonic wave is included in the reception signal. When the multi-feeding is detected based on the reception signal, detection accuracy deteriorates.

On the other hand, like the signal A2 and the signal A3, as the first angle θ is set to 10° or more, the variation in the reception signal when the distance $L_1$ is changed decreases. This means that the multiple reflection component of the ultrasonic wave, received by the reception unit 152, is reduced. That is, as the first angle θ increases, noise caused by the multiple reflection component can be suppressed, and when the multi-feeding is detected based on the reception signal, the detection accuracy can be improved.

Figure 7:
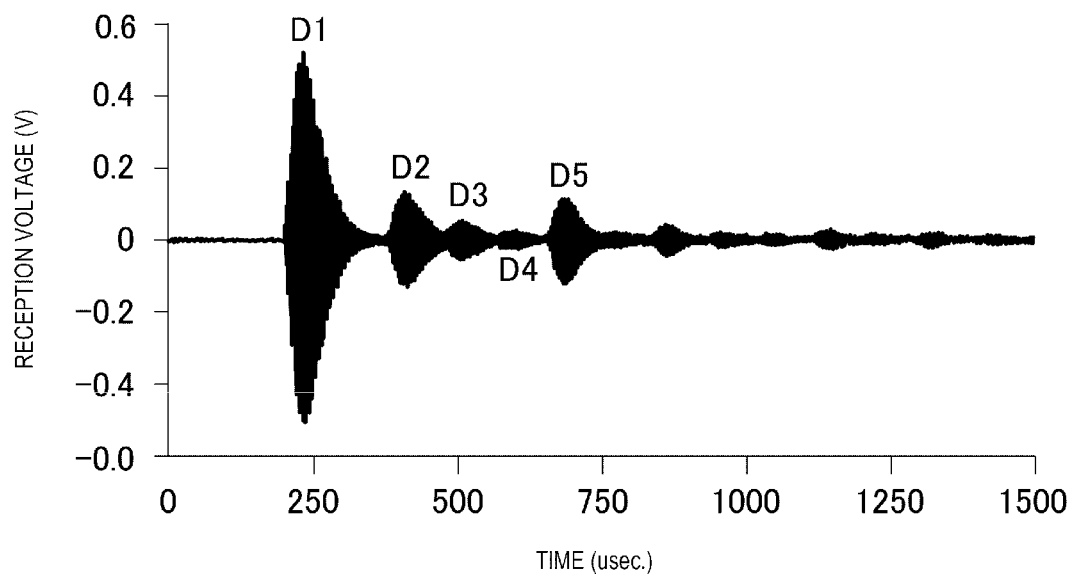
FIG. 7 is a graph depicting a waveform of a reception signal if an ultrasonic wave is transmitted from the transmission unit, when the protective member is disposed to be perpendicular to the sensor center axis and no paper sheet is disposed.

FIG. 7 is a graph depicting a waveform of the reception signal from the reception unit 152 if the ultrasonic wave is output from the transmission unit 151, when the protective member 154 is disposed to be perpendicular to the sensor center axis 15C and no paper sheet P is disposed in the transport passage 130.

In FIG. 7, a signal D1 is a reception signal based on the ultrasonic wave input to the main reception body unit 152B without being reflected by any member.

The signal D2 is a reception signal based on the ultrasonic wave that is reflected by the protective member 154 on the transmission unit 151 side, is reflected by the transmission unit 151, and is then input to the main reception body unit 152B among the ultrasonic wave transmitted from the transmission unit 151.

The signal D3 is a reception signal based on the ultrasonic wave that is reflected by the reception unit 152, is reflected by the protective member 154 on the reception unit 152 side again, and is then input to the main reception body unit 152B among the ultrasonic wave transmitted from the transmission unit 151.

The signal D4 is a reception signal based on the ultrasonic wave that is reflected by the reception unit 152, is reflected by the protective member 154 on the transmission 151 side, and is then input to the main reception body unit 152B among the ultrasonic wave transmitted from the transmission unit 151.

The signal D5 is a reception signal based on the ultrasonic wave that is reflected by the reception unit 152, is reflected by the transmission unit 151 again, and is then input to the main reception body unit 152B among the ultrasonic wave transmitted from the transmission unit 151.

Figure 8:
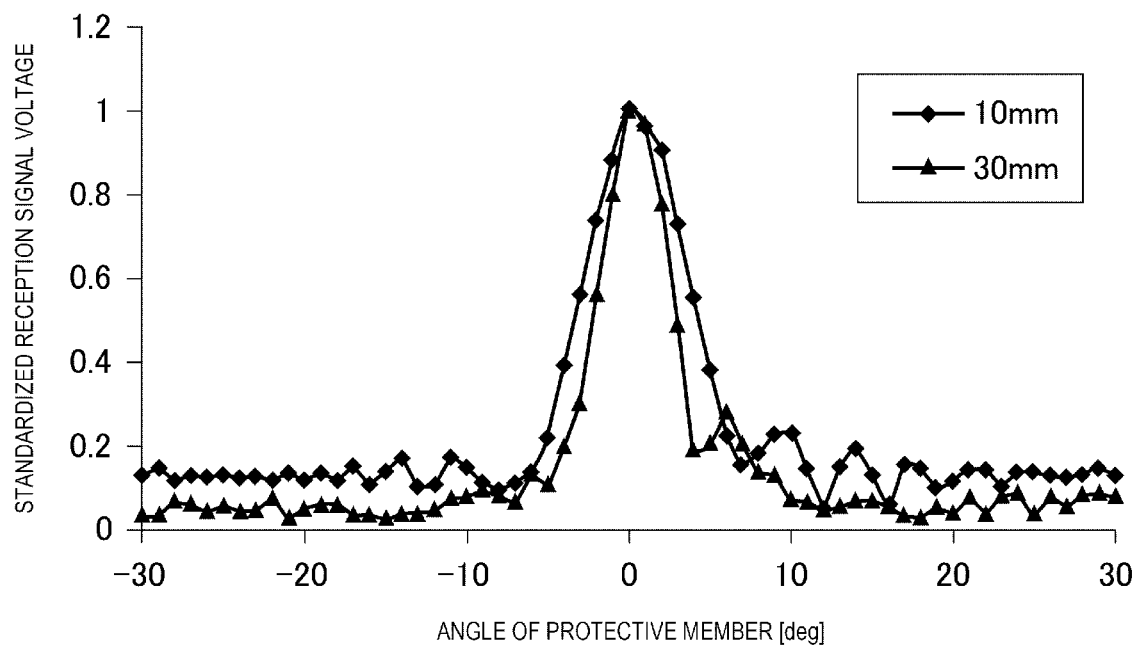
FIG. 8 is a graph depicting a change in a signal D2 of FIG. 7 when the angle between the normal line of the protective member and the sensor center axis changes.

FIG. 8 is a graph depicting two examples of a change in the signal D2 of FIG. 7 when L1=10 mm and 30 mm, if the first angle θ between the normal line of the protective member 154 and the sensor center axis 15C changes. As shown in FIG. 8, when the first angle θ between the normal line of the protective member 154 and the sensor center axis 15C increases, the voltage value of the reception signal decreases.

It is preferable that in order to suppress a decrease in multi-feeding detection accuracy due to the reception signal based on multiple reflection, an inclination angle of the protective member 154 is set such that the voltage value of the reception signal is at least equal to or less than a half value of the reception voltage when the first angle θ is 0°.

In this case, as shown in FIG. 8, as the first angle θ is set to 5° or more, regardless of the distance $L_1$, the voltage value of the reception signal may be made equal to or less than a half value of the reception signal when the first angle θ is set to 0°, and the multiple reflection between the protective member 154 and the main transmission body unit 151B can be suppressed.

This relationship is also established in the reception unit 152. However, even in the reception unit 152, as the first angle θ is set to 5° or more, the multiple reflection between the protective member 154 and the main reception body unit 152B can be suppressed.

It is preferable that simultaneously considering the intensifying and the weakening of the ultrasonic wave by the above-described multiple reflection, in the transmission unit 151 and the reception unit 152, the first angle θ is set to 10° or more.

Figure 9:
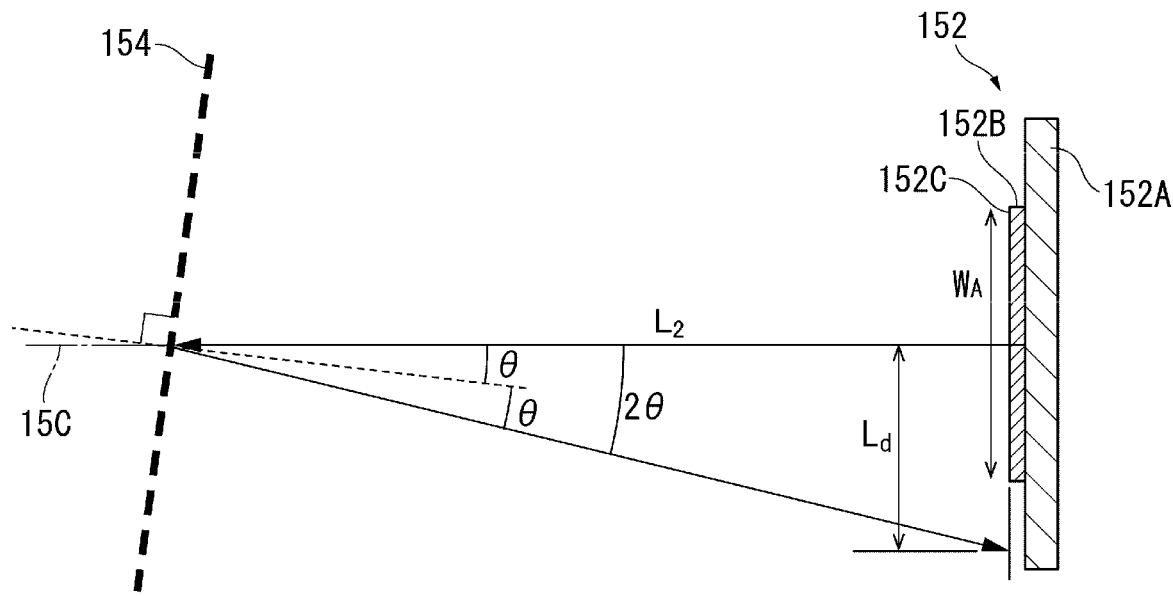
FIG. 9 is a view for illustrating dimensions of the protective member and a main reception body unit according to the present embodiment.

FIG. 9 is a view for illustrating a positional relationship between the protective member 154 and the main reception body unit 152B.

A distance between the protective member 154 and the reception surface 152C on the sensor center axis 15C is set as L2. When the ultrasonic wave input to the main reception body unit 152B along the sensor center axis 15C is reflected by the reception surface 152C and is reflected by the protective member 154 on the reception unit 152 side again, the re-reflected ultrasonic wave is input to a position where separated from the sensor center axis 15C by a distance Ld (Ld=$L_2$·tan (2θ)) in the same plane as the reception surface 152C.

As shown in FIG. 9, it is preferable that when the width of the reception surface 152C in a plane including the sensor center axis 15C is set as $W_A$, the main reception body unit 152B satisfying $W_A/2 < L_d$ is provided. That is, it is preferable that the width $W_A$ of the reception surface 152C satisfies WA<$2L_2$·tan(2θ). Accordingly, it is possible to further suppress inconvenience that the ultrasonic wave re-reflected by the protective member 154 is received by the main reception body unit 152B.

It is more preferable that the width $W_A$ of the reception surface 152C satisfies $W_A < L_d$. That is, it is more preferable that the width $W_A$ of the reception surface 152C satisfies WA<$L_2$·tan(2θ). In this case, regardless of a position where the ultrasonic wave is input to the reception surface 152C, it is possible to suppress inconvenience that the ultrasonic wave reflected by the reception surface 152C is reflected by the protective member 154 again and is input to the reception surface 152C again.

This relationship is also established in the main transmission body unit 151B. However, when the width of the transmission surface 151C is set as $W_B$, it is preferable that the main transmission body unit 151B satisfying $W_B < 2L_1$·tan(2θ) is provided. It is more preferable that $W_B < L_1$·tan(2θ).

Further, when the ultrasonic wave is transmitted from the main transmission body unit 151B, in addition to a direction from the transmission surface 151C to the reception unit 152, the ultrasonic wave is transmitted from the transmission-side fixed surface 151B1 that is opposite to the transmission surface 151C to the transmission pedestal portion 151A along the sensor center axis 15C.

Here, when a normal line of the proximal end-side end surface 151A1 of the transmission pedestal portion 151A coincides with the sensor center axis 15C, the ultrasonic wave is multi-reflected between the proximal end-side end surface 151A1 and the main transmission body portion 151B. Therefore, the multi-reflected ultrasonic wave is superimposed on the ultrasonic wave traveling from the transmission surface 151C toward the reception unit 152, the sound pressure of the transmitted ultrasonic wave fluctuates, and multi-feeding detection accuracy by the ultrasonic sensor 15 is reduced.

In contrast, in the present embodiment, as shown in FIG. 3, the proximal end-side end surface 151A1 of the transmission pedestal portion 151A is inclined with respect to the tip end-side end surface 151A2. That is, a normal line of the proximal end-side end surface 151A1 is inclined with respect to the sensor center axis 15C.

Accordingly, the ultrasonic wave, which is transmitted from the main transmission body unit 151B along the sensor center axis 15C to the transmission pedestal portion 151A side, is reflected by the proximal end-side end surface 151A1 in a direction that is difficult from the sensor center axis 15C. Thus, the above-described multi-feeding is suppressed.

Here, when the voltage of the reception signal is measured when an angle of the normal line of the proximal end-side end surface 151A1 with respect to the sensor center axis 15C changes, measurement results substantially similar to those of FIG. 8 are obtained. That is, when the angle of the normal line of the proximal end-side end surface 151A1 with respect to the sensor center axis 15C belongs to a range of ±5°, the reception signal increases and the multi-feeding detection accuracy becomes unstable, due to the multiple reflection component.

In contrast, as the angle of the normal line of the proximal end-side end surface 151A1 with respect to the sensor center axis 15C is set to 5° or more, influence of the multiple reflection can be suppressed. As the angle is 10° or more, the influence of the multiple reflection can be suppressed more effectively.

Circuit Configuration of Ultrasonic Sensor 15

Figure 10:
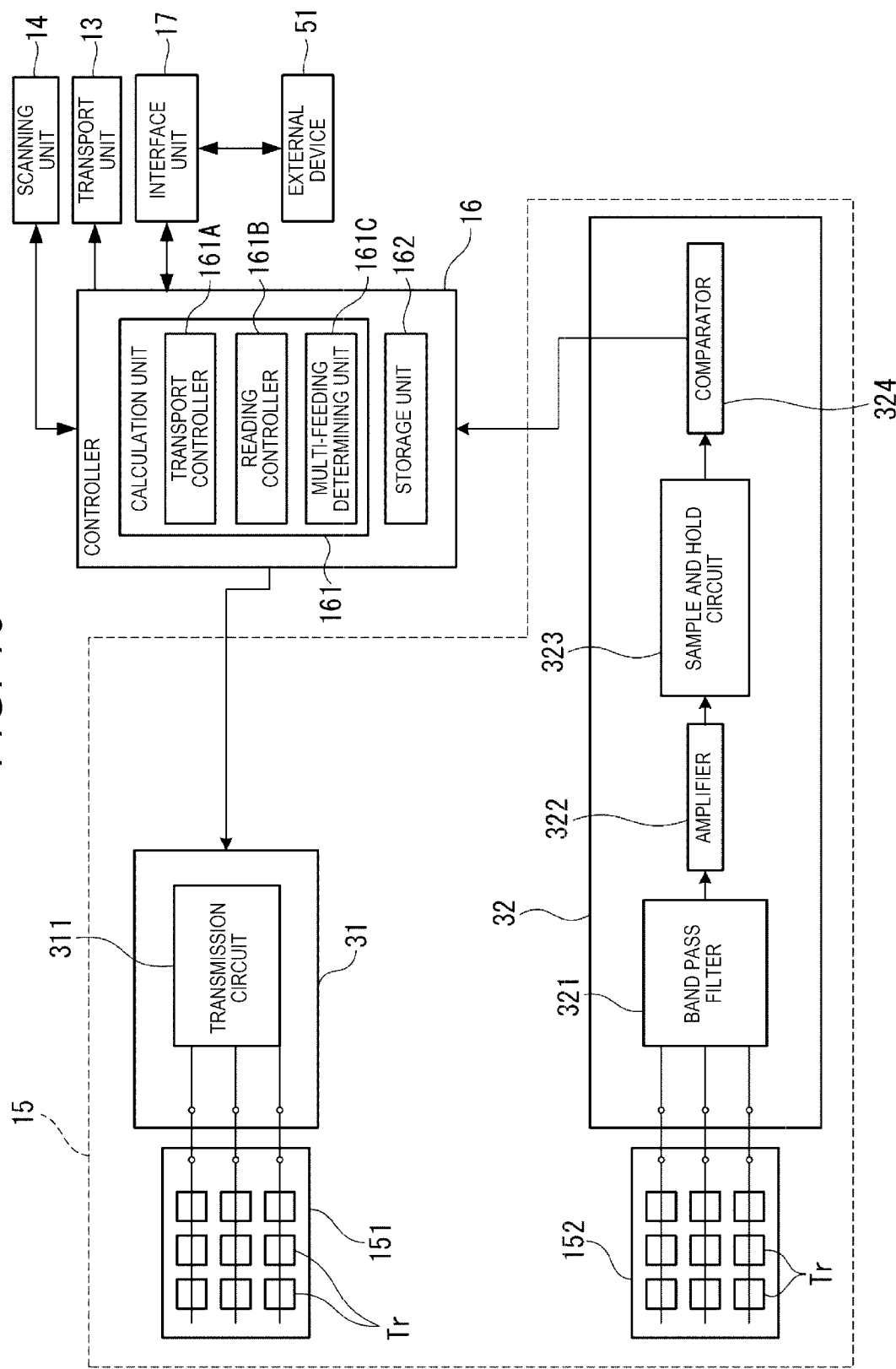
FIG. 10 is a block diagram showing a control configuration of the image scanner according to the present embodiment.

FIG. 10 is a block diagram showing a control configuration of the image scanner 10.

In the present embodiment, as a circuit configuration of the ultrasonic sensor 15, a transmission control circuit that controls driving of the transmission unit 151 is provided as the transmission circuit board 31, and a reception processing circuit that controls driving of the reception unit 152 is provided in the reception circuit board 32. The circuit configuration of the ultrasonic sensor 15 is not limited thereto. As described above, a circuit configuration that controls the reception unit 152 may be provided integrally with the transmission circuit board 31 or a circuit configuration that controls the transmission unit 151 may be provided integrally with the reception circuit board 32. In addition, these circuit configurations may be configured with a plurality of circuit boards.

In the present embodiment, as shown in FIG. 10, a transmission circuit 311 is provided in the transmission circuit board 31.

The transmission circuit 311 is electrically connected to the ultrasonic transducer Tr of the main transmission body unit 151B to generate a driving signal for driving the ultrasonic transducer Tr.

Further, the reception circuit board 32 is provided with a reception circuit or the like, which processes the reception signal to output the processed signal to the controller 16. A general circuit that processes the reception signal input in response to the reception of the ultrasonic wave may be used as the reception circuit. As shown in FIG. 10, the reception circuit may be configured with a band pass filter 321, an amplifier 322, a sample and hold circuit 323, a comparator 324, and the like. The reception signal output from the main reception body unit 152B is input to the band pass filter 321. The noise component of this reception signal is removed by the band pass filter 321, the reception signal is amplified to a predetermined signal intensity or more by the amplifier 322, and the amplified signal is input to the sample and hold circuit 323. The sample and hold circuit 323 samples the reception signal at a predetermined frequency, and the sampled reception signal is input to the comparator 324. The comparator 324 detects the reception signal, the signal intensity of which exceeds a predetermined threshold, among the sampled reception signal, and inputs the detected reception signal to the controller 16.

Configuration of Controller 16

As shown in FIG. 10, the controller 16 includes a calculation unit 161 configured by a central processing unit (CPU) or the like and a storage unit 162 configured by a storage circuit such as a memory.

This controller 16 is connected to the transport motor 135 of the transport unit 13, the scanning unit 14, and the ultrasonic sensor 15 to control driving of the transport motor 135, the scanning unit 14, and the ultrasonic sensor 15. Further, the controller 16 is connected to an interface unit 17 to receive various pieces of data or various signals input from an external device 51 such as a personal computer and to output read data read by the image scanner 10 to the external device 51.

The storage unit 162 stores various pieces of data and various programs for controlling the image scanner 10.

As shown in FIG. 10, the calculation unit 161 loads and executes various programs stored in the storage unit 162 so as to function as a transport controller 161A, a reading controller 161B, a multi-feeding determining unit 161C, and the like.

The transport controller 161A controls the transport motor 135 of the transport unit 13 to rotate a plurality of the motor pairs 131 to 134 so as to feed the paper sheet P set in the sheet support 12 into the main apparatus body 11 one by one. Further, the transport controller 161A transports the fed paper sheet P along the transport passage 130.

The reading controller 161B controls the scanning unit 14 while the paper sheet P is transported, and reads an image of the paper sheet P.

The multi-feeding determining unit 161C is a state detecting unit that detects a state of the paper sheet P. In the present embodiment, the multi-feeding determining unit 161C controls the ultrasonic sensor 15 to determine the multi-feeding of the paper sheet P based on the reception signal input from the reception unit 152.

In detail, when the voltage value of the reception signal is less than a predetermined threshold, it is determined that the paper sheet P is being multi-fed. When the multi-feeding determining unit 161C determines that the multi-feeding occurs, the transport controller 161A stops the transport of the paper sheet P.

Operational Effect of Present Embodiment

The ultrasonic sensor 15 according to the present embodiment includes a transmission unit 151 that executes transmission processing of transmitting the ultrasonic wave to the paper sheet P along the sensor center axis 15C and a reception unit 152 that executes reception processing of receiving the ultrasonic wave input from the paper sheet P along the sensor center axis 15C. Thus, in the present embodiment, the mesh-like protective member 154 is provided between the transmission unit 151 and the paper sheet P and between the reception unit 152 and the paper sheet P.

In such a configuration, the protective member 154 can suppress entry of foreign substances such as paper dust, and can suppress adhesion and accumulation of the foreign substances to and from the transmission surface 151C and the reception surface 152C. Therefore, the ultrasonic sensor 15 can suppress a decrease in transmission and reception sensitivity of the ultrasonic wave.

Further, in the image scanner 10, since the ultrasonic sensor 15 can perform ultrasonic wave transmission reception processing at high transmission and reception sensitivity, it is possible to detect the multi-feeding of the paper sheet P at high accuracy, based on the reception signal output from the main reception body unit 152B.

The ultrasonic sensor 15 according to the present embodiment includes the shielding unit 153 having the substantially cylindrical shielding wall 153A while taking the sensor center axis 15C as a central axis. The transmission unit 151 and the reception unit 152 are arranged to be surrounded by the shielding wall 153λ of the shielding unit 153, and the shielding unit 153 is provided to extend from a position where the shielding unit 153 surrounds the transmission unit 151 and the reception unit 152 to the transport passage 130 side through which the paper sheet P is transported. Thus, the through-hole 153C through which the ultrasonic wave passes is provided at an extension tip end portion of the shielding unit 153 on the transport passage 130 side. The protective member 154 is provided to cover the through-hole 153C.

Therefore, the transmission unit 151 and the reception unit 152 are configured to be surrounded by the protective member 154 and the shielding unit 153. That is, the protective member 154 can suppress entry of the foreign substances from a direction along the sensor center axis 15C, and the shielding unit 153 can suppress entry of the foreign substances from a direction other than the sensor center axis 15C.

Further, since the shielding unit 153 is made of a conductive material, it is possible to suppress influence of static electricity and electromagnetic waves on the main transmission body unit 151B and the main reception body unit 152B.

In the ultrasonic sensor 15 according to the present embodiment, the normal line of the protective member 154 is inclined with respect to the sensor center axis 15C.

Therefore, in the ultrasonic sensor 15 according to the present embodiment, it is possible to suppress the multiple reflection of the ultrasonic wave between the transmission unit 151 and the protective member 154 and the multiple reflection of the ultrasonic wave between the reception unit 152 and the protective member 154.

In particular, as in the present embodiment, when the ultrasonic sensor 15 is used as a multi-feeding sensor, when the reception unit 152 receives the multiple reflection component of the ultrasonic wave, the reception signal is amplified. In this case, even when a plurality of paper sheets P are transported to the transport passage 130, the reception signal having a predetermined voltage value or more may be output, and the multi-feeding of the paper sheet cannot be properly determined. In contrast, in the present embodiment, inconvenience that the multiple reflection component of the ultrasonic wave is input to the reception unit 152 is suppressed, so that it is possible to detect the multi-feeding at high detection accuracy.

In the present embodiment, the normal line of the protective member 154 is inclined at the first angle θ of 5° or more with respect to the sensor center axis 15C.

In this case, the voltage value of the reception signal, which is caused by the ultrasonic wave multi-reflected between the main reception body unit 152B and the protective member 154 on the reception unit 152 side, may be equal to or less than a half value of the voltage value of the reception signal when the first angle θ is 0°. Further, a distance between the protective member 154 on the transmission unit 151 side and the main reception body unit 152B is larger than a distance between the protective member 154 on the reception unit 152 side and the main reception body unit 152B. Thus, even when the ultrasonic wave multi-reflected between the main reception body unit 152B and the protective member 154 on the transmission unit 151 side is input to the main reception body unit 152B, the reception voltage thereof is equal to or less than a half of the voltage value of the reception signal when the first angle θ is 0°.

That is, as described above, as the first angle θ is equal to or more than 5°, the voltage value of the reception signal when the main reception body unit 152B receives the multiple reflection component of the ultrasonic wave can decrease, and the variation in the reception signal can be suppressed. Accordingly, stable multi-feeding detection processing can be realized.

In the present embodiment, as the plurality of wires 154A are arranged along the Xm direction and the Ym direction, the protective member 154 is configured in a mesh shape. The wire diameter $W_1$ of each wire 154A is smaller than the wavelength of the ultrasonic wave transmitted by the transmission unit 151. Therefore, inconvenience that the ultrasonic wave transmitted by the transmission unit 151 is reflected by the protective member 154 can be suppressed.

Thus, the image scanner 10 according to the present embodiment has the multi-feeding determining unit 161C that detects the multi-feeding of the paper sheet P, based on the reception signal output from the reception unit 152 of the above-described ultrasonic sensor 15. As described above, in the present embodiment, since the adhesion and the accumulation of the foreign substances to and from the transmission unit 151 and the reception unit 152 of the ultrasonic sensor 15 is suppressed, transmission sensitivity of the transmission unit 151 and reception sensitivity of the reception unit 152 can be maintained high. Thus, the multi-feeding determining unit 161C can determine the multi-feeding of the paper sheet P at high accuracy, based on the reception signal output from such an ultrasonic sensor 15.

Second Embodiment

Next, a second embodiment will be described.

The second embodiment differs from the first embodiment in that a sound absorbing unit is provided in the shielding unit 153 according to the first embodiment.

In the following description, the already-described component is designated by the same reference numeral, and description thereof will be omitted or simplified.

Figure 11:
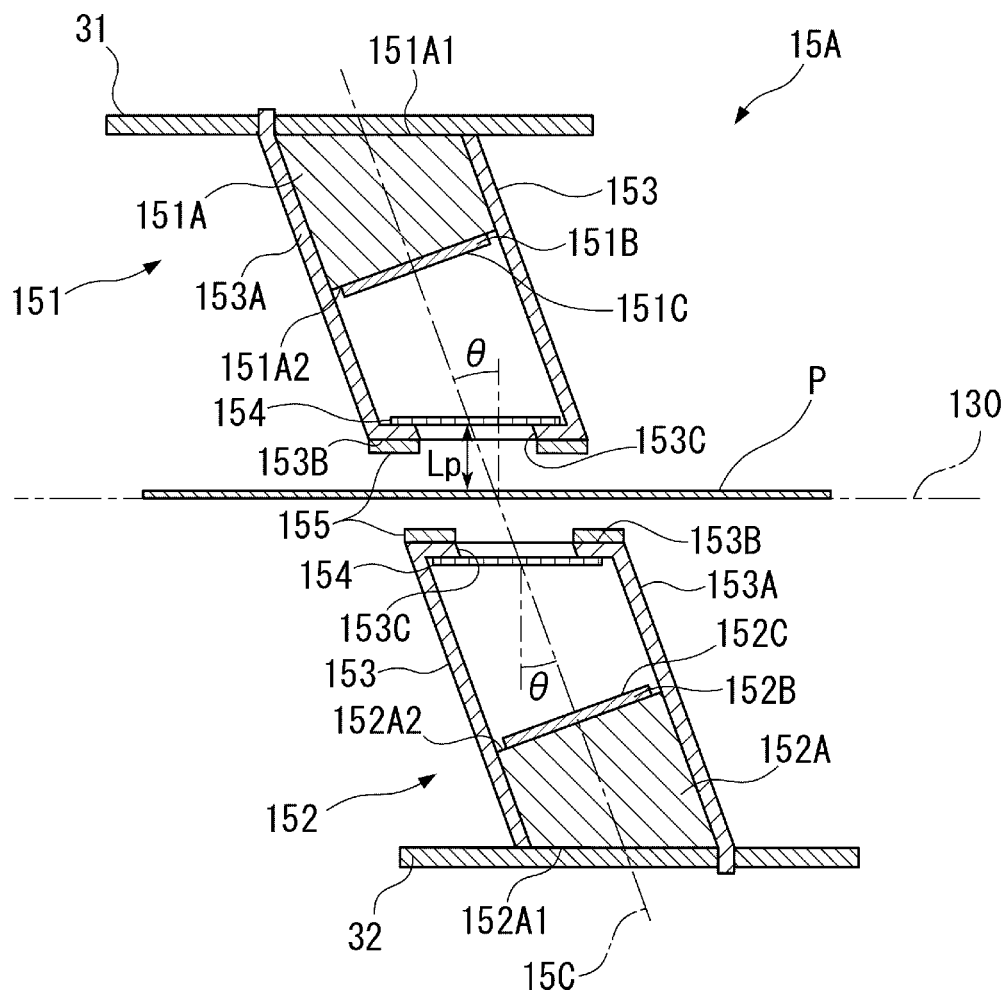
FIG. 11 is a sectional view showing a schematic configuration of an ultrasonic sensor according to a second embodiment.

FIG. 11 is a sectional view showing a schematic configuration of an ultrasonic sensor 15A according to the second embodiment.

In the present embodiment, similar to the first embodiment, the ultrasonic sensor 15A includes the transmission unit 151, the reception unit 152, the shielding unit 153, and the protective member 154.

Thus, in the present embodiment, a sound absorbing unit 155 is provided on a surface of the shielding unit 153, which faces the transport passage 130, that is, a surface of the protrusion portion 153B, which faces the transport passage 130.

This sound absorbing unit 155 is configured by providing a porous member such as urethane. In the present embodiment, as shown in FIG. 11, although an example where the sound absorbing unit 155 that is a porous member having sound absorbing characteristics is provided in the protrusion portion 153B is shown, the present disclosure is not limited thereto. A configuration that is obtained by performing surface roughening on a surface of the protrusion portion 153B, facing the transport passage 130, and scatters the ultrasonic wave, may be adopted as the sound absorbing unit 155.

Figure 12:
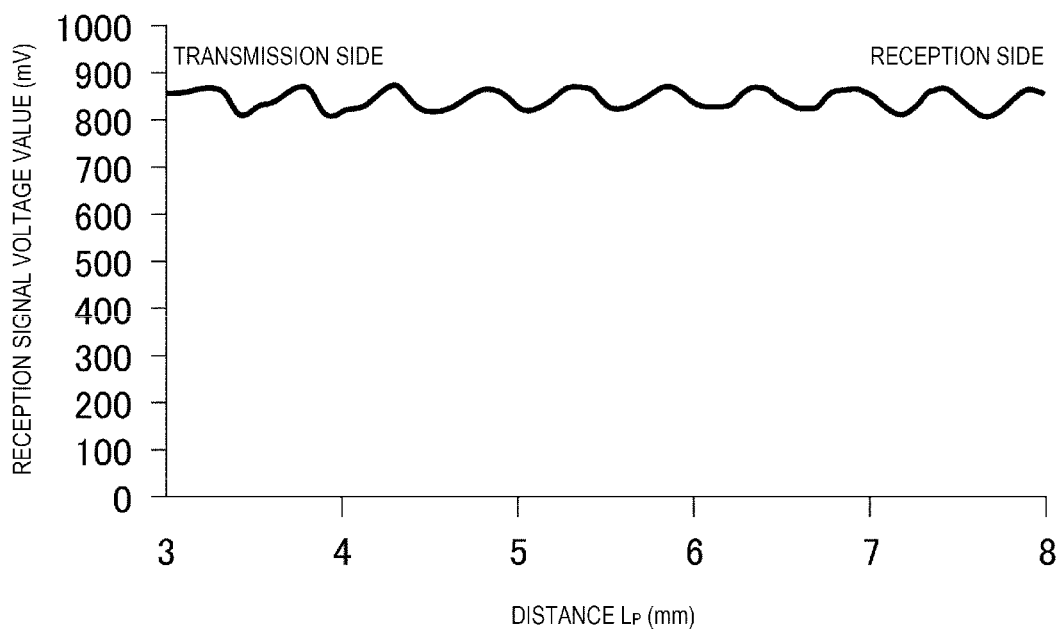
FIG. 12 is a graph depicting a change in a reception signal when a distance between a protective member on a transmission unit side and a paper sheet is changed when a sound absorbing unit and the protective member are not provided in a shielding unit.
Figure 13:
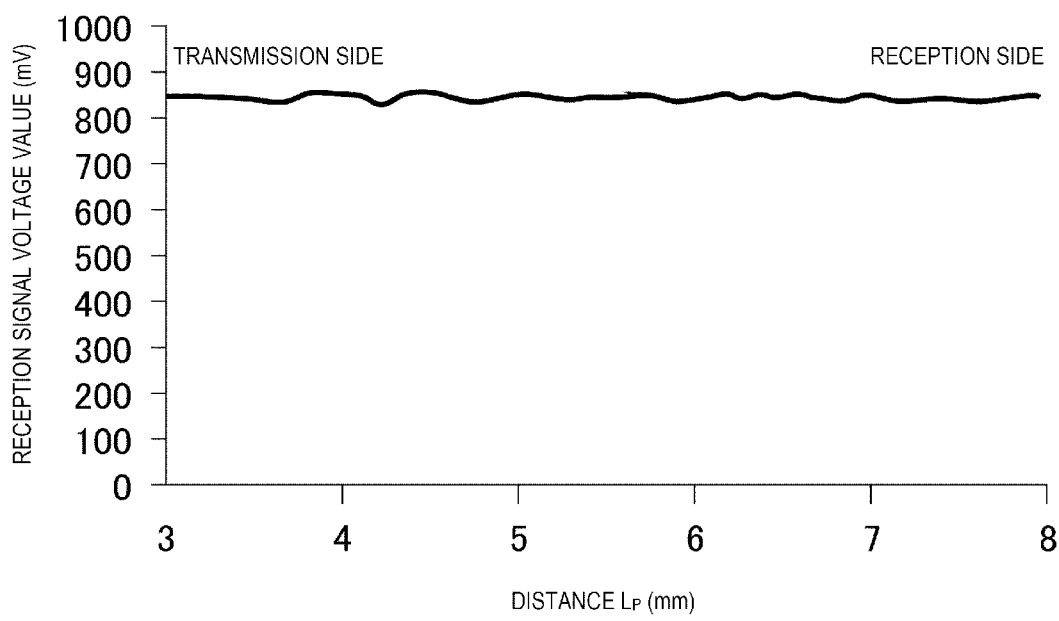
FIG. 13 is a graph depicting the change in the reception signal when the distance between the protective member on the transmission unit side and the sheet is changed when not the protective member but the sound absorbing unit is provided in the shielding unit.

FIGS. 12 and 13 are graphs depicting a change in the reception signal by the sound absorbing unit 155. FIG. 12 is a graph depicting the change in the reception signal when a distance $L_P$ from a surface of the protective member 154 on the transmission unit 151 side, facing the paper sheet P, to the paper sheet P is changed when the sound absorbing unit 155 and the protective member 154 are not provided in the shielding unit 153. Further, FIG. 13 is a graph depicting the change in the reception signal when the distance $L_P$ is changed when not the protective member 154 but the sound absorbing unit 155 is provided in the shielding unit 153.

When the sound absorbing unit 155 is not provided in the shielding unit 153, as shown in FIG. 12, the variation in the voltage value of the reception signal when the distance $L_P$ is changed increases, and the variation in the voltage value becomes 5.9%. This indicates that the ultrasonic component multi-reflected between the protrusion portion 153B and the paper sheet P is large.

In contrast, as shown in FIG. 13, when the sound absorbing unit 155 is provided in the shielding unit 153, the variation in the voltage value of the reception signal when the distance $L_P$ is changed becomes 2.1%. That is, it can be seen that as the sound absorbing unit 155 is provided, the ultrasonic wave multi-reflected between the protrusion portion 153B and the paper sheet P is weakened.

Operational Effect of Present Embodiment

In the present embodiment, the following effects in addition to the effects described in the above-described first embodiment can be achieved.

In the ultrasonic sensor 15A according to the present embodiment, the sound absorbing unit 155 surrounding the through-hole 153C is provided on a surface of the protrusion portion 153B of the shielding unit 153, facing the paper sheet P.

In such a configuration, the multiple reflection of the ultrasonic wave between the shielding unit 153 and the paper sheet P can be suppressed. As described above, when the reception unit 152 receives the multiple reflection component, the reception signal is intensified, and thus there is a concern that the multi-feeding of the paper sheet P cannot be properly determined. In the present embodiment, such a multiple reflection component can be suppressed, and the multi-feeding of the paper sheet P can be properly determined.

Third Embodiment

Next, a third embodiment will be described.

In the first embodiment and the second embodiment, an example is shown in which the normal line of the protective member 154 is inclined at the first angle with respect to the sensor center axis 15C, and coincides with a normal line of the paper sheet P as an object. In contrast, the third embodiment differs from the first embodiment and the second embodiment in that the normal line of the protective member 154 is inclined with respect to the normal line of the paper sheet P.

Figure 14:
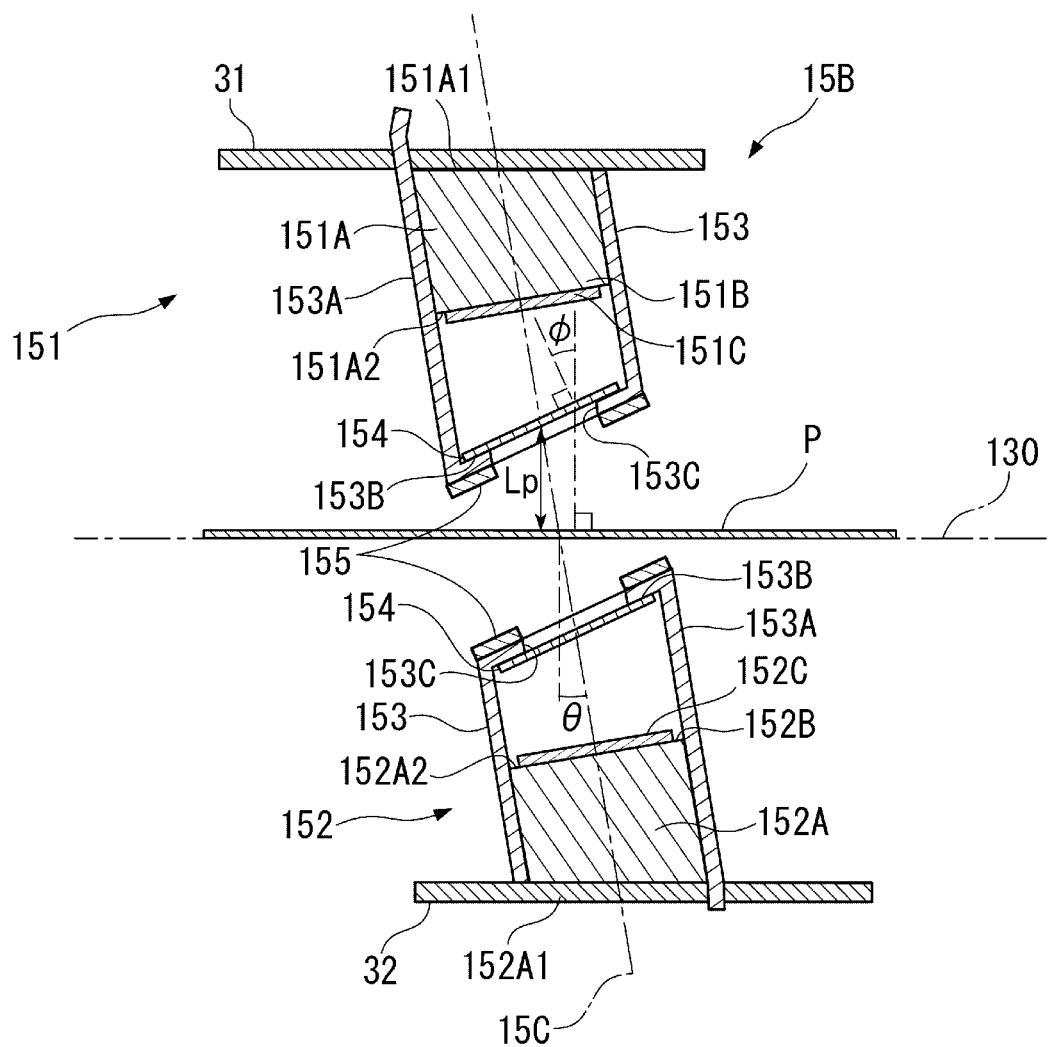
FIG. 14 is a sectional view showing a schematic configuration of an ultrasonic sensor according to a third embodiment.

FIG. 14 is a sectional view showing a schematic configuration of an ultrasonic sensor 15B according to the third embodiment.

In FIG. 14, as in the second embodiment, the sound absorbing unit 155 is provided in the protrusion portion 153B.

Thus, in the present embodiment, as illustrated in FIG. 14, the sensor center axis 15C is inclined at the first angle θ with respect to the normal line of the paper sheet P. Further, the normal line of the protrusion portion 153B, that is, a normal line of the XmYm plane in the protective member 154, is inclined at a second angle φ that is different from the first angle θ with respect to the normal line of the paper sheet P.

That is, the normal line of the protective member 154 is inclined at an angle of θ−φ with respect to the sensor center axis 15C, and the XmYm plane of the protective member 154 is inclined at an angle of θ+φ with respect to the paper sheet P transported to the transport passage 130.

Figure 15:
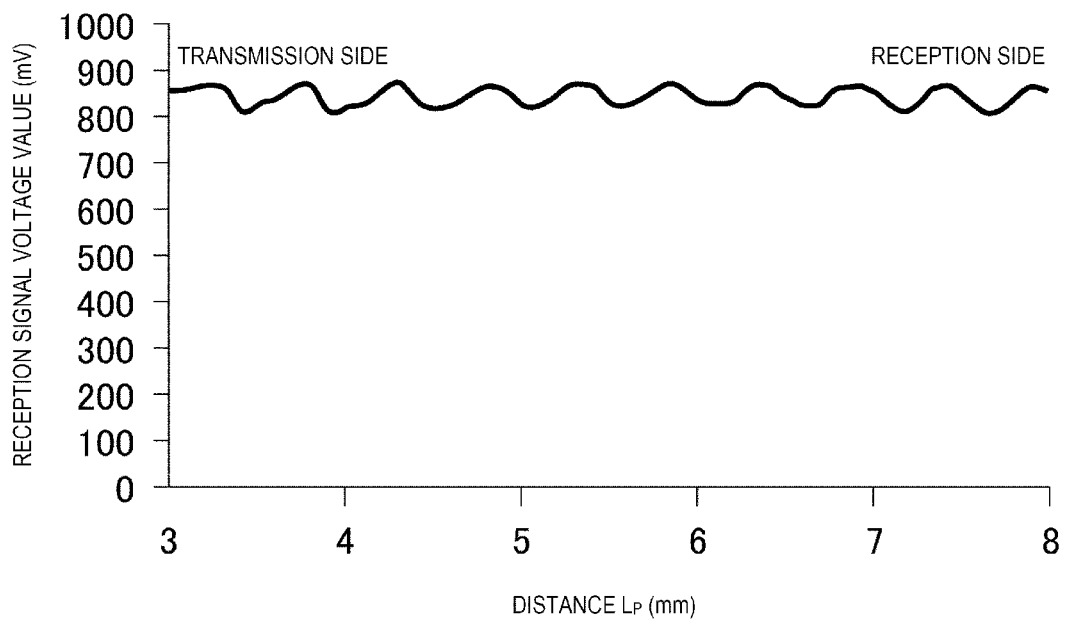
FIG. 15 is a graph depicting a change in a reception signal when a distance between a protective member on a transmission unit side and a paper sheet is changed in the second embodiment.

FIG. 15 is a graph depicting a change in a reception signal when the distance $L_P$ from a surface of the protective member 154 on the transmission unit 151 side, facing the paper sheet P, to the paper sheet is changed in the second embodiment. Further, FIG. 16 shows the reception signal when the distance $L_P$ is changed in the third embodiment.

In the first embodiment and the second embodiment, it is possible to suppress the multiple reflection between the reception surface 152C and the protective member 154 and between the transmission surface 151C and the protective member 154. Further, in the second embodiment, as the sound absorbing unit 155 is provided, it is possible to also suppress the multiple reflection between the protrusion portion 153B and the paper sheet P. However, as in FIG. 15, when the distance $L_P$ is changed, the voltage value of the reception signal slightly varies, and the variation in the voltage value becomes 6.1%. This indicates that since the protective member 154 and the paper sheet P transported to the transport passage 130 are parallel or substantially parallel to each other, the multiple reflection occurs between the protective member 154 and the paper sheet P.

Figure 16:
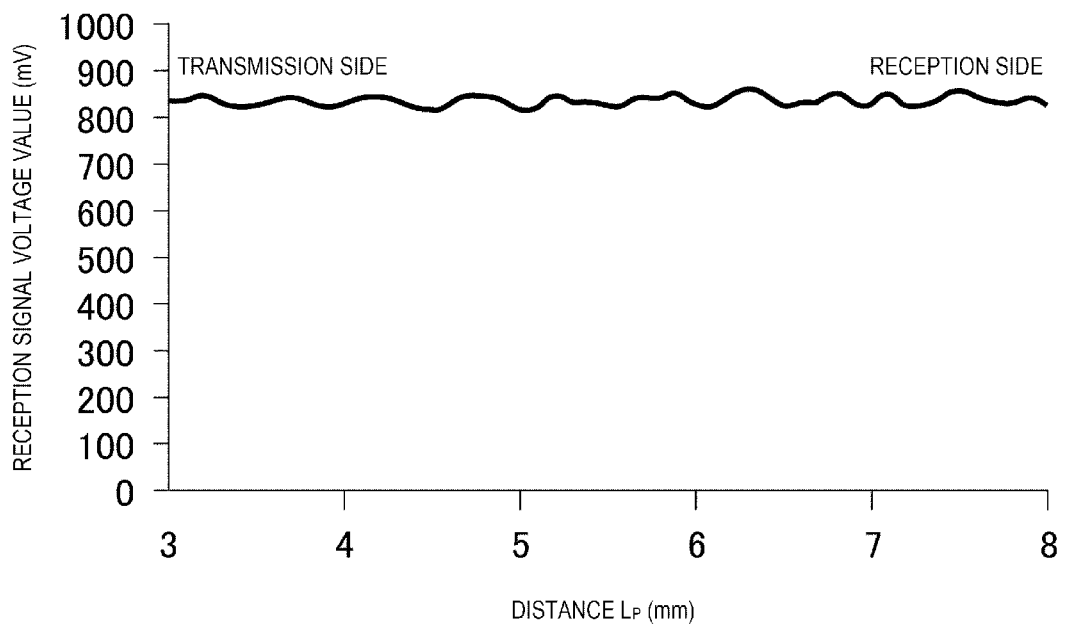
FIG. 16 is a graph depicting a change in a reception signal when a distance between a protective member on a transmission unit side and a paper sheet is changed in a third embodiment.

In contrast, as shown in FIG. 16, the variation in the voltage value of the reception signal when the distance $L_P$ is changed becomes 0.8%. This means that the multiple reflection between the protective member 154 and the paper sheet P is suppressed.

That is, in the present embodiment, it is possible to suppress the multiple reflection of the ultrasonic wave between the reception surface 152C and the protective member 154, between the transmission surface 151C and the protective member 154, between the protrusion portion 153B and the paper sheet P, and between the protective member 154 and the paper sheet P, and it is possible to effectively suppress inconvenience that the noise component caused by the multiple reflection is superimposed in the reception signal.

Operational Effect of Present Embodiment

In the present embodiment, the following effects in addition to the effects described in the first embodiment and the second embodiment can be achieved.

That is, in the present embodiment, the sensor center axis 15C is inclined at the first angle θ with respect to a normal line of the transport passage 130 along which the paper sheet P is transported as in the first embodiment. Further, the normal line of the XmYm plane of the protective member 154 is inclined at the second angle φ that is different from the first angle θ with respect to the normal line of the transport passage 130.

In this case, it is possible to suppress the multiple reflection of the ultrasonic wave between the protective member 154 and the paper sheet P in addition to between the transmission unit 151 and the protective member 154 and between the reception unit 152 and the protective member 154. Further, similar to the second embodiment, as the sound absorbing unit 155 is provided to surround the through-hole 153C, it is possible to also suppress the multiple reflection between the protrusion portion 153B and the paper sheet P.

Therefore, in the present embodiment, it is possible to further suppress inconvenience that the multi-reflected ultrasonic wave is received by the reception unit 152, and it is possible to properly determine the multi-feeding of the paper sheet P.

Modification Example

The present disclosure is not limited to the above-described embodiments, and modifications, improvements, and configurations obtained by appropriately combining the embodiments as long as an object of the present disclosure can be achieved are included in the present disclosure.

Modification Example 1

Figure 17:
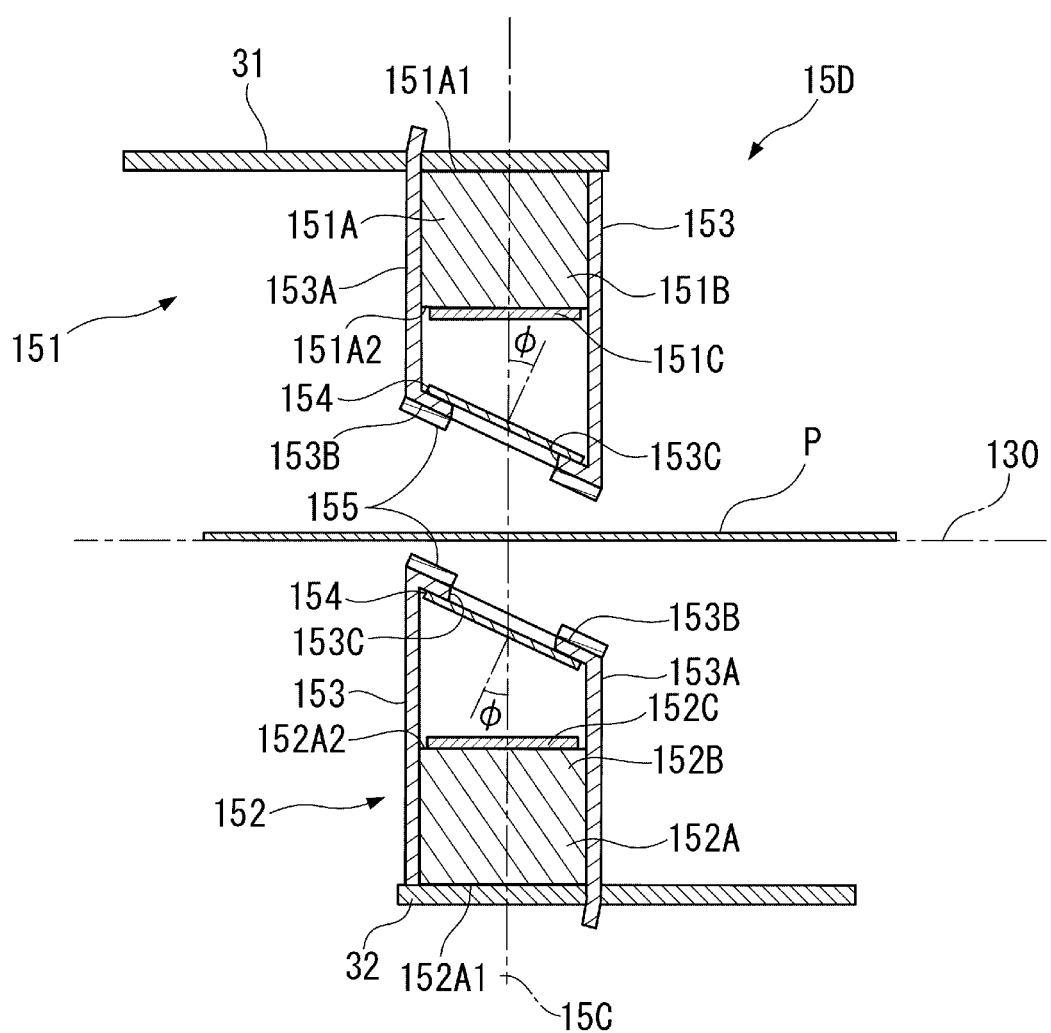
FIG. 17 is a sectional view showing a schematic configuration of an ultrasonic sensor according to a modification example 1.

In the first to third embodiments, the sensor center axis 15C is inclined with respect to the normal line of the paper sheet P. However, the present disclosure is not limited thereto. FIG. 17 is a sectional view showing a configuration of an ultrasonic sensor 15D according to a modification example 1.

As illustrated in FIG. 17, the transmission unit 151 is disposed such that the sensor center axis 15C is parallel or substantially parallel to the normal line of the paper sheet P. In this case, the normal line of the protective member 154 is configured to be inclined with respect to the sensor center axis 15C.

In such a configuration, the multiple reflection between the transmission unit 151 and the protective member 154 and between the reception unit 152 and the protective member 154 is suppressed. Further, the multiple reflection between the protective member 154 and the paper sheet P is also suppressed. Further, an arrangement space of the ultrasonic sensor 15D can be reduced, as compared to a case where the sensor center axis 15C is inclined. Further, since the arrangement space of the ultrasonic sensor 15D is reduced, an electronic device such as the image scanner 10 can be miniaturized.

Modification Example 2

Figure 18:
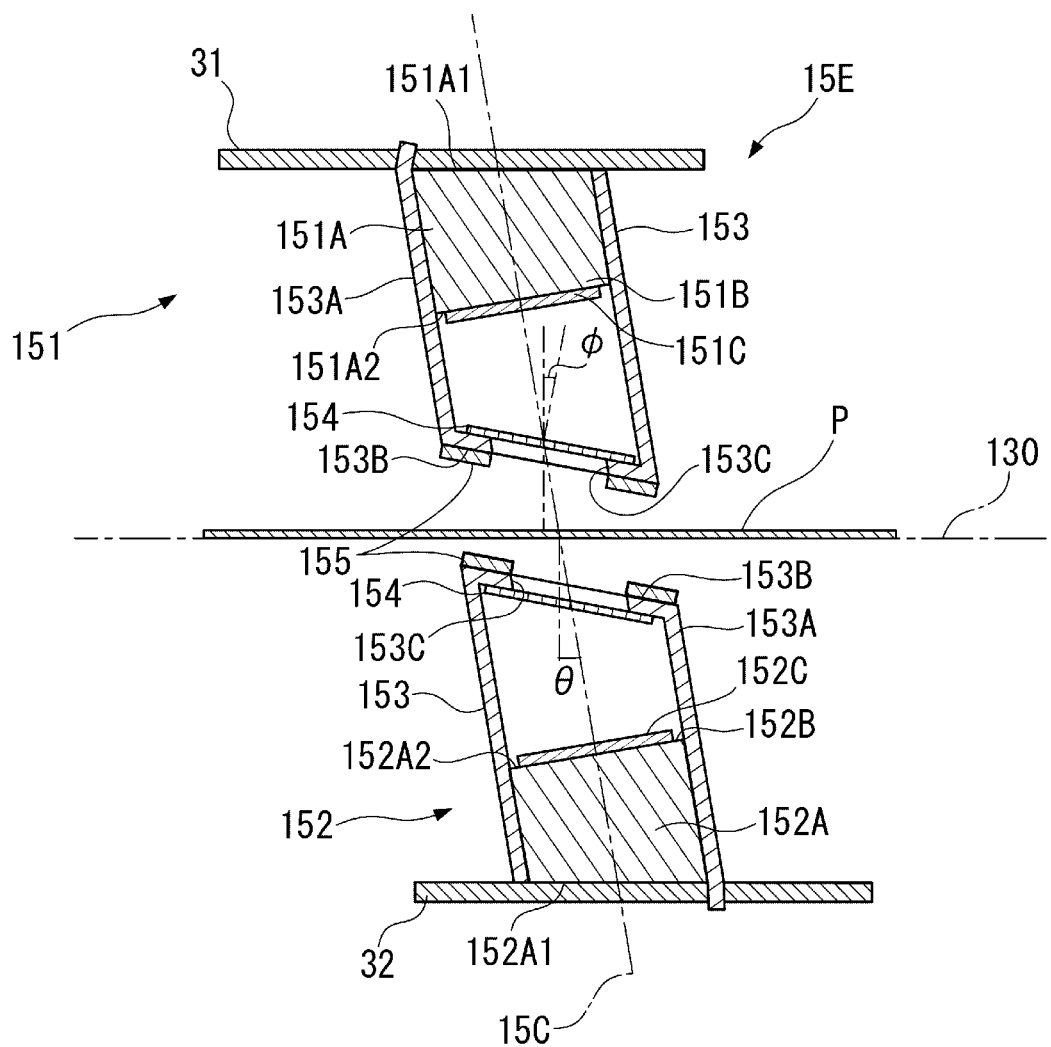
FIG. 18 is a sectional view showing a schematic configuration of an ultrasonic sensor according to a modification example 2.

FIG. 18 is a sectional view showing a configuration of an ultrasonic sensor 15E according to a modification example 2.

In the third embodiment, the configuration has been described in which the sensor center axis 15C and the normal line of the protective member 154 are inclined with respect to the normal line of the paper sheet P. Here, in the third embodiment, an example is shown in FIG. 14 in which the transmission surface 151C and the protective member 154 on the transmission unit 151 side are inclined in the same direction with respect to the normal line of the paper sheet P, that is, is inclined upward to the right side.

In contrast, as illustrated in FIG. 18, the sensor center axis 15C may be inclined in different directions with respect to the normal line of the paper sheet P. As illustrated in FIG. 18, the transmission surface 151C and the reception surface 152C may be inclined upward to the right side, and the protective member 154 may be inclined downward to the right side.

Modification Example 3

Figure 19:
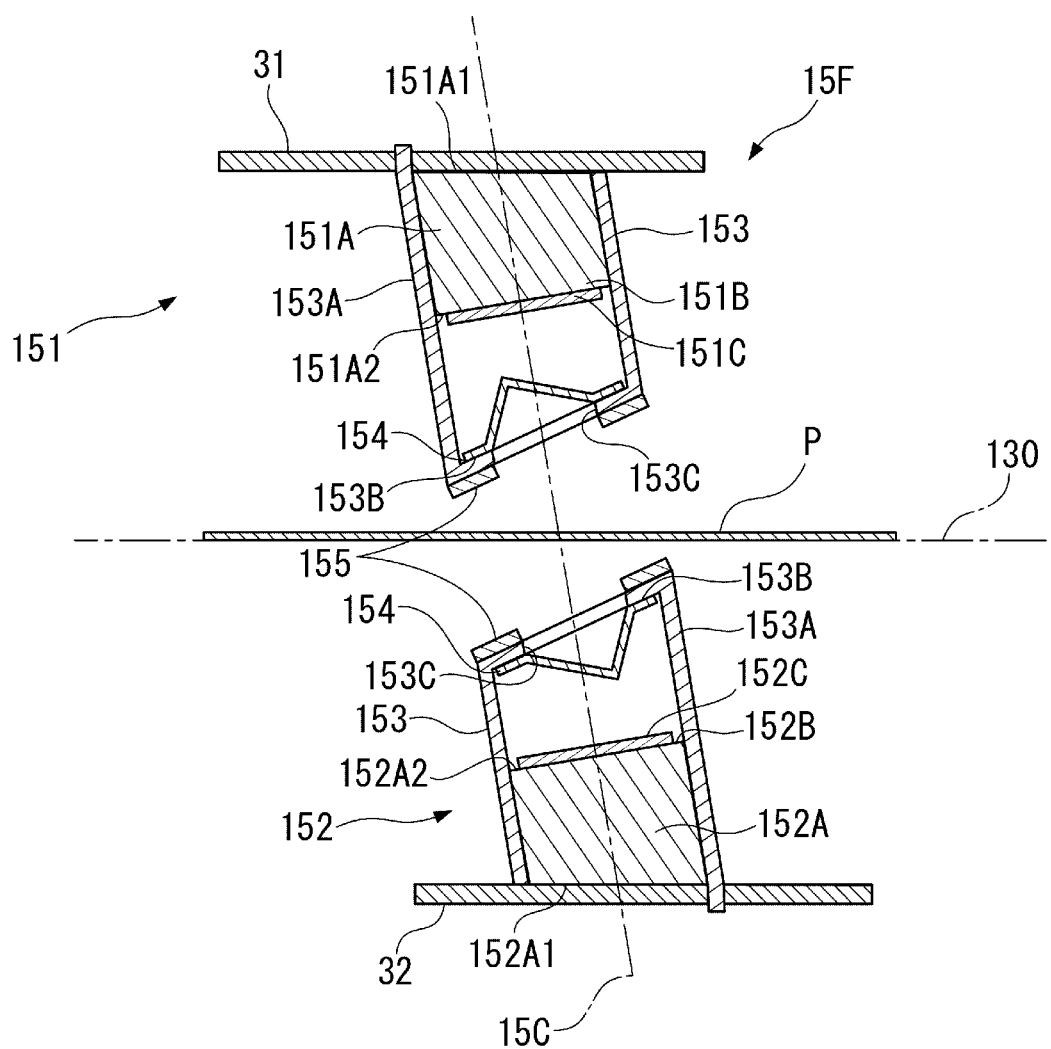
FIG. 19 is a sectional view showing a schematic configuration of an ultrasonic sensor according to a modification example 3.
Figure 20:
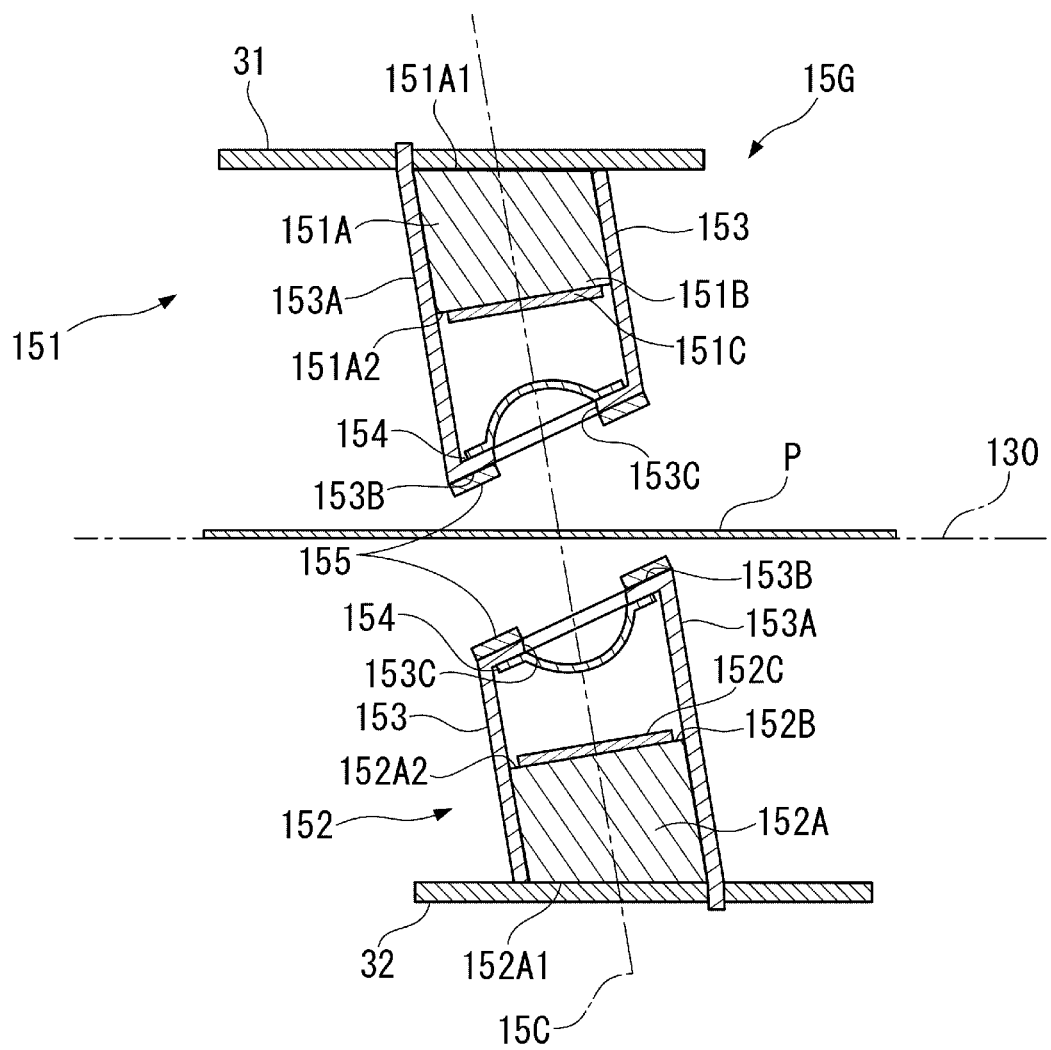
FIG. 20 is a sectional view showing the schematic configuration of the ultrasonic sensor according to the modification example 3.

FIGS. 19 and 20 are views showing configurations of ultrasonic sensors 15F and 15G according to a modification example 3.

In the above-described embodiment, the protective member 154 is formed as the plurality of wires 154A are arranged on the XmYm plane. An example in which the protective member 154 has a planar shape is shown. In contrast, like the ultrasonic sensor 15F illustrated in FIG. 19, the protective member 154 may be bent to have two inclined surfaces. Further, like the ultrasonic sensor 15G illustrated in FIG. 20, the protective member 154 may have a curved surface. Even in any case, it is possible to suppress the multiple reflection between the protective member 154 and the ultrasonic element and the multiple reflection between the protective member 154 and the paper sheet P.

Further, FIGS. 19 and 20 show an example in which the sensor center axis 15C is inclined with respect to the normal line of the paper sheet P. However, as illustrated in FIG. 17, similarly, even when the sensor center axis 15C is parallel to the normal line of the paper sheet P, the protective member 154 may be bent to have two inclined surfaces or may have a curved surface.

Modification Example 4

In the present embodiment, although an example is shown in which the protective member 154 is formed by arranging the plurality of wires 154A in the Xm direction and the Ym direction and has a mesh shape, the present disclosure is not limited thereto.

FIGS. 21 to 25 are plan views showing schematic configurations of protective members according to modification examples.

Figure 21:
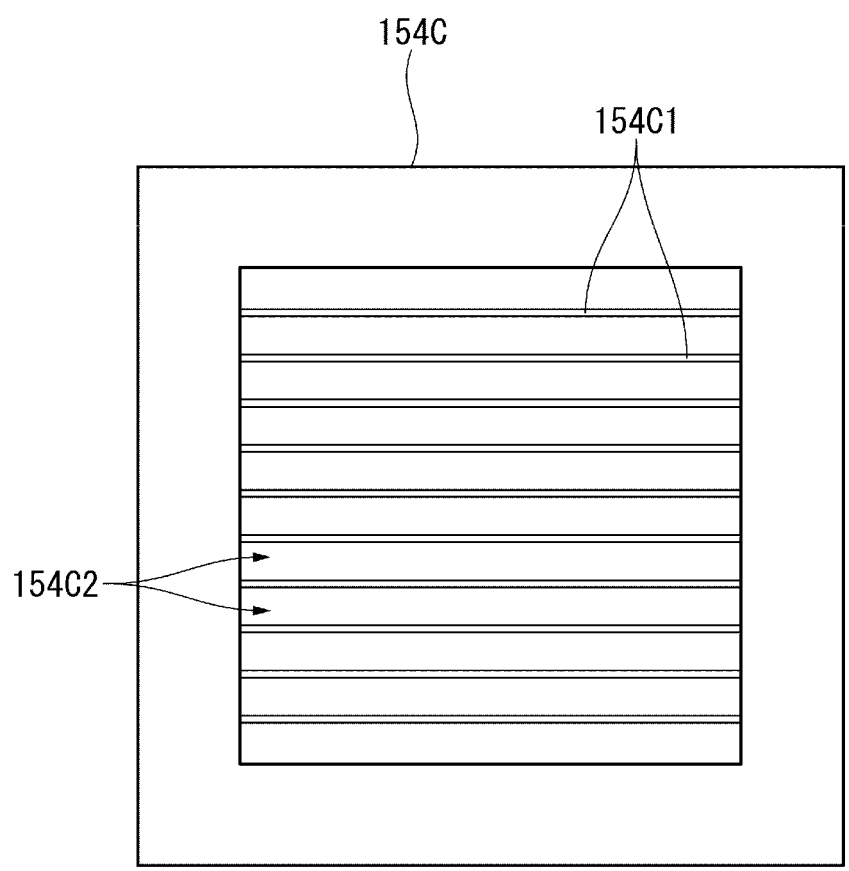
FIG. 21 is a plan view showing a configuration example of a protective member according to a modification example 4.

For example, as illustrated in FIG. 21, the protective member 154C may be configured by arranging a plurality of wires 154C1 in parallel. The plurality of wires 154C1 may be parallel to the Xm direction, may be parallel to the Ym direction, and may be parallel to directions inclined in the Xm direction and the Ym direction. In this case, the air gap 154C2 between the adjacent wires 154C1 corresponds to a hole through which the ultrasonic wave passes along the sensor center axis 15C.

Figure 22:
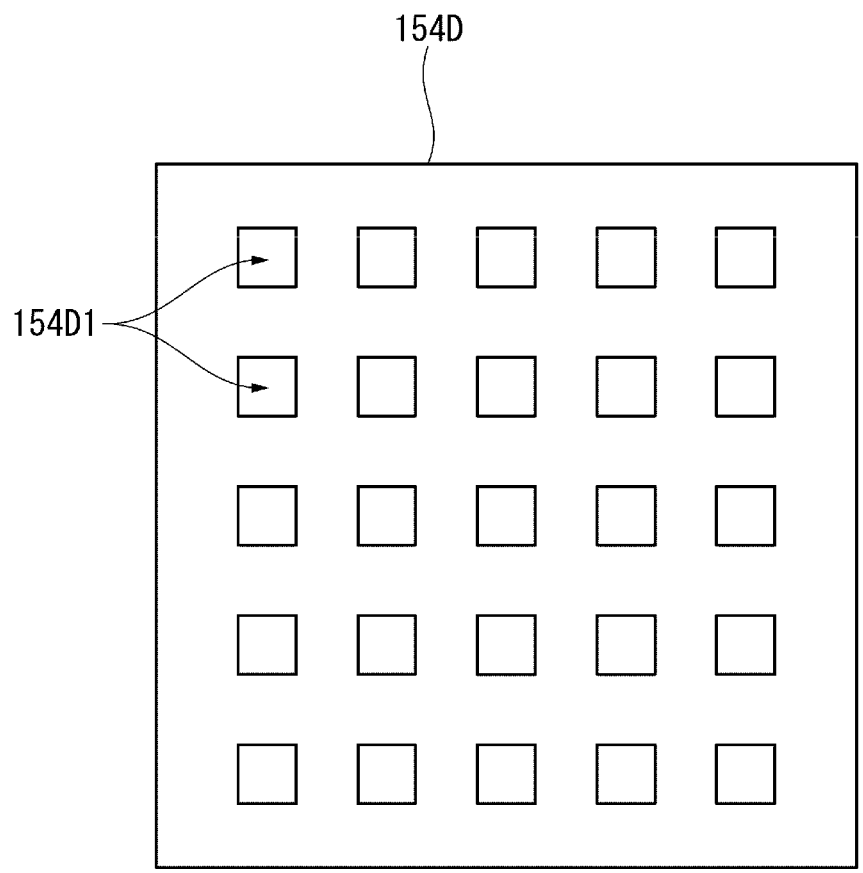
FIG. 22 is a plan view showing another configuration example of the protective member according to the modification example 4.
Figure 23:
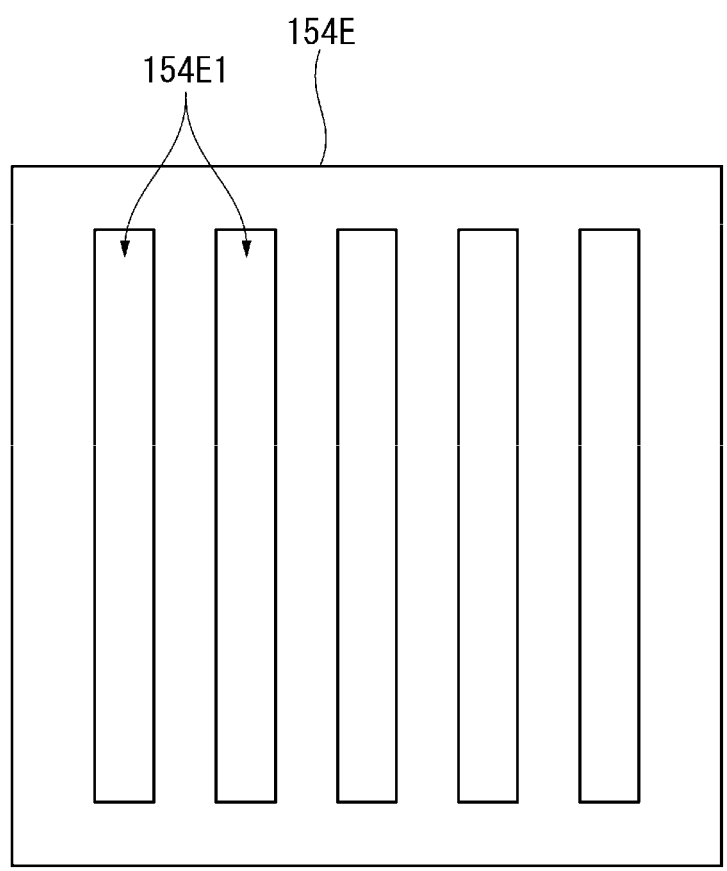
FIG. 23 is a plan view showing still another configuration example of the protective member according to the modification example 4.

Further, as illustrated in FIG. 22, the protective member 154D may be configured with, for example, a flat plate, and may be provided with a plurality of through-holes 154D1 penetrating the flat plate in a plate thickness direction.

In an example illustrated in FIG. 22, although the plurality of square through-holes 154D1 are arranged along the Xm direction and the Ym direction, the shape of the through-holes 154D1 is not limited thereto. For example, as shown in a protective member 154E shown in FIG. 23, slit-like through-holes 154E1 that are elongated in one direction may be provided.

Further, a plurality of through-hoes having different shapes may be provided in a flat protective member.

Figure 24:
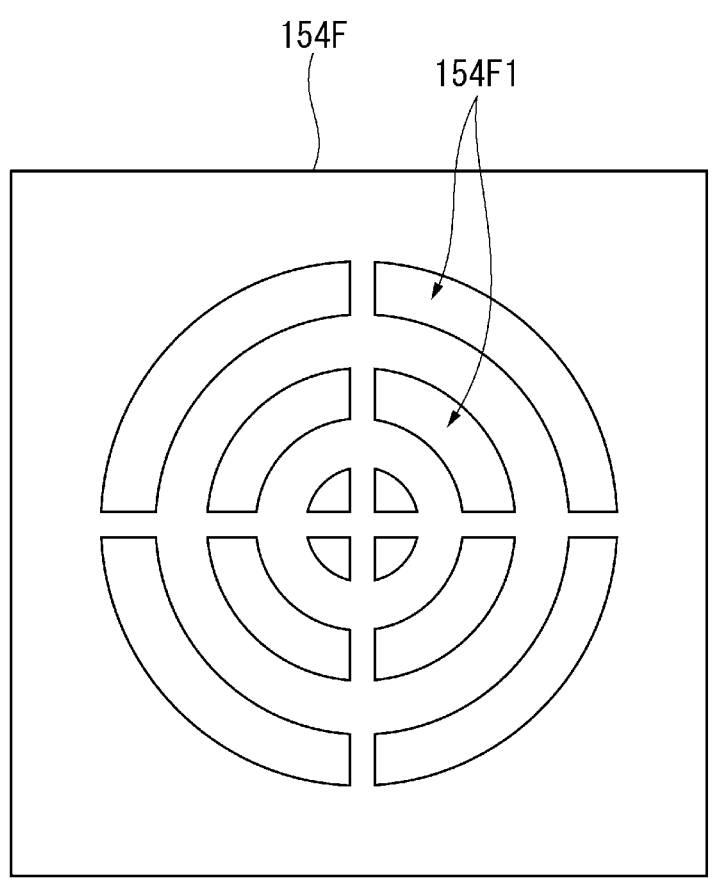
FIG. 24 is a plan view showing still another configuration example of the protective member according to the modification example 4.

For example, in the protective member 154F shown in FIG. 24, through-holes 154F1 are arranged along a plurality of concentric circles while taking a central point of the protective member 154F as a center, and the lengths of arcs of the circles are different from each other.

Figure 25:
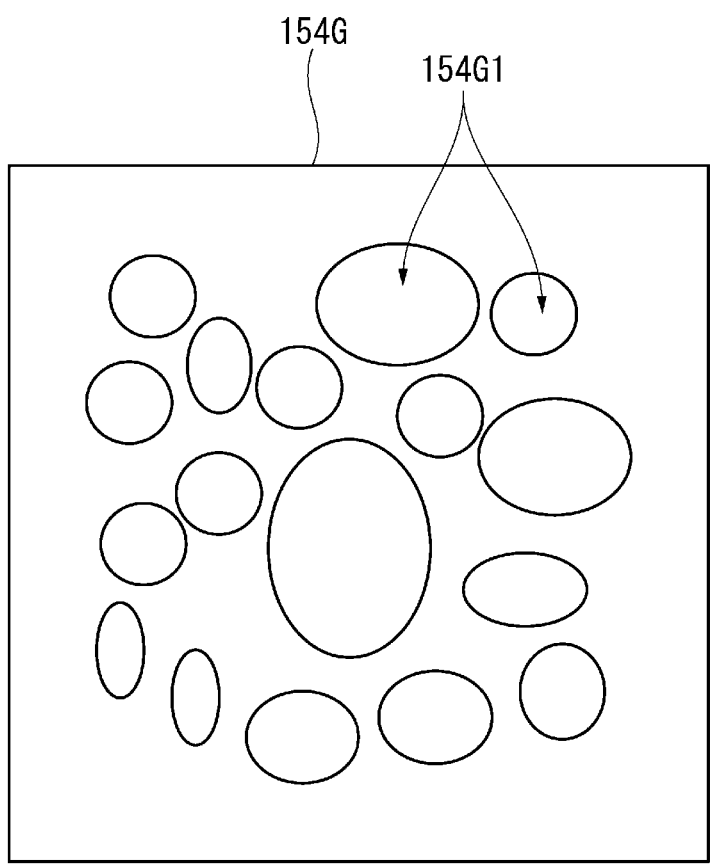
FIG. 25 is a plan view showing still another configuration example of the protective member according to the modification example 4.

Further, as shown in the protective member 154G shown in FIG. 25, a plurality of through-holes 154G1 having different shapes and sizes may be arranged.

These through-holes 154D1, 154E1, 154F1, and 154G1 correspond to holes through which the ultrasonic wave passes along the sensor center axis 15C.

Further, although the air gaps 154B and 154C2 in the above-described embodiment and FIG. 21 and the through-holes 154D1, 154E1, 154F1, and 154G1 shown in FIGS. 22 to 25 are holes that pass through the protective members 154, 154C, 154D, 154E, 154F, and 154G along the sensor center axis 15C, the present disclosure is not limited thereto.

For example, the protective member may be made of a porous member. For example, non-woven fabric and a foam material having an open cell structure may be adopted as the porous member. In this way, in the protective member, the gap of the non-woven fabric and the open cell structure of the foam material are holes allowing communication from a surface of the protective member on the transmission unit 151 side to a surface of the protective member on the reception unit 152 side, and allow the ultrasonic wave to passes therethrough along the sensor center axis 15C.

In addition, the protective member may have any structure that has a plurality of holes allowing communication from one surface to the other surface of the protective member and allows the ultrasonic wave to pass therethrough along the sensor center axis 15C.

Modification Example 5

In the above-described first embodiment, the transmission unit 151 and the reception unit 152 constituting the ultrasonic sensor 15 each have the shielding unit 153 having a substantially cylindrical shielding wall 153A, and one end of the shielding unit 153 is fixed to the transmission circuit board 31 or the reception circuit board 32. Further, the shielding unit 153 includes a substantially cylindrical shielding wall 153A. The transmission pedestal portion 151A and the main transmission body unit 151B or the reception pedestal portion 152A and the main reception body unit 152B are provided inside a cylinder.

Figure 26:
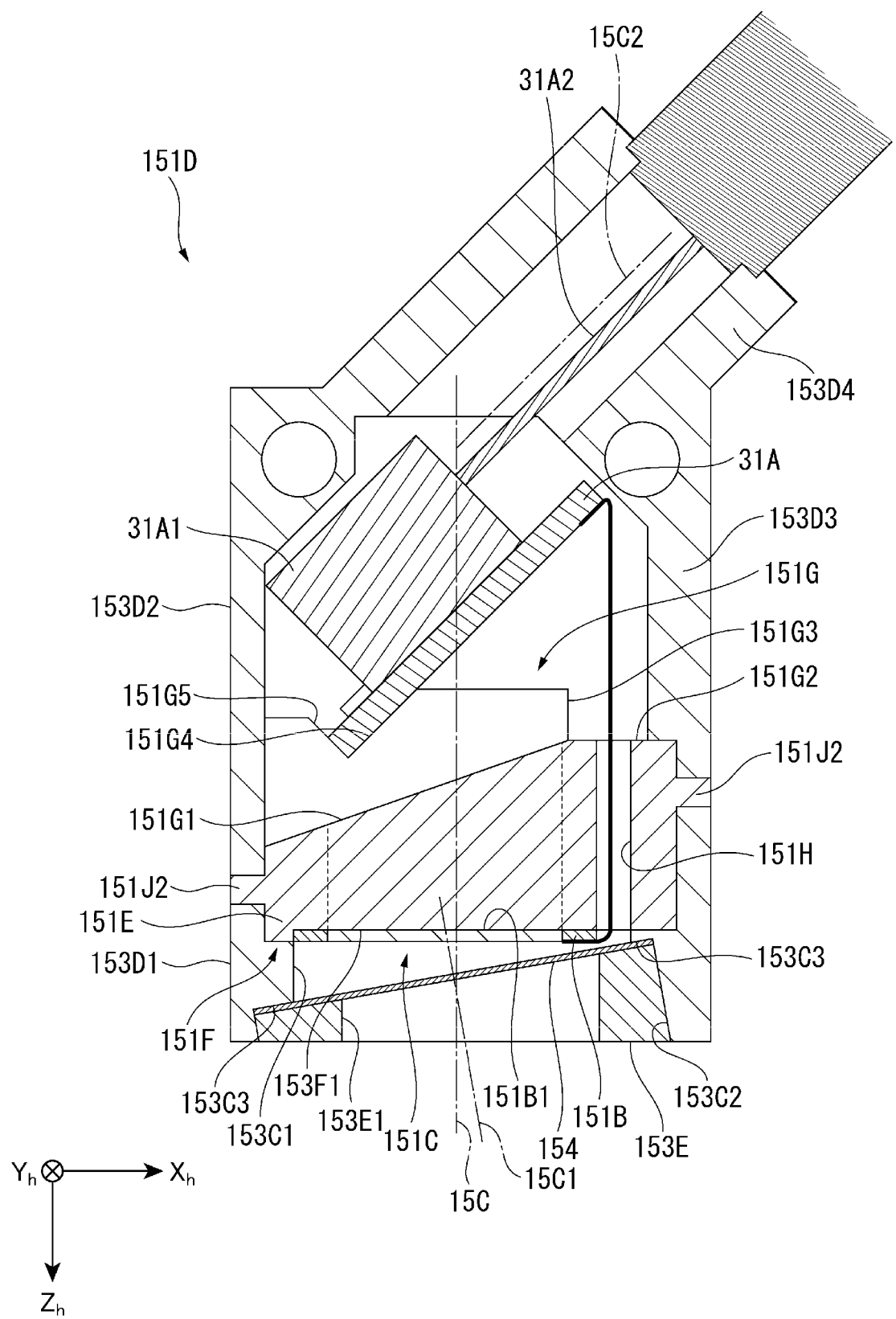
FIG. 26 is a sectional view showing a configuration of the transmission unit according to a modification example 5.

In contrast, a configuration of the shielding unit is not limited to the above-described embodiment, and may be, for example, a configuration shown in FIG. 26.

FIG. 26 is a sectional view schematically showing the transmission unit 151D according to a modification example 5. Here, the transmission unit 151D will be described. However, the reception unit may have the same configuration.

In FIG. 26, a direction that is parallel to the sensor center axis 15C is set as a Zh direction, a direction that is perpendicular to the Zh direction is set as an Xh direction, and a direction that is perpendicular to the Zh direction and the Xh direction is set as a Yh direction. The following description will be made on the assumption that the ultrasonic wave is transmitted in a +Zh direction. FIG. 26 is a sectional view showing the transmission unit 151D when taken along a plane that is parallel to the XhZh plane including the Xh direction and the Zh direction.

As illustrated in FIG. 26, the transmission unit 151D has a transmission pedestal portion 151E to which the main transmission body unit 151B is joined, and a first shielding unit 153D1 and a second shielding unit 153D2 arranged with the transmission pedestal portion 151E interposed therebetween.

The first shielding unit 153D1 and the second shielding unit 153D2 are cylindrical members having a central axis that is parallel to the sensor center axis 15C. The shape of a cylindrical inner circumferential surface when viewed along the Zh direction is a rectangular shape having two sides parallel to the Xh direction and two sides parallel to the Yh direction.

Figure 27:
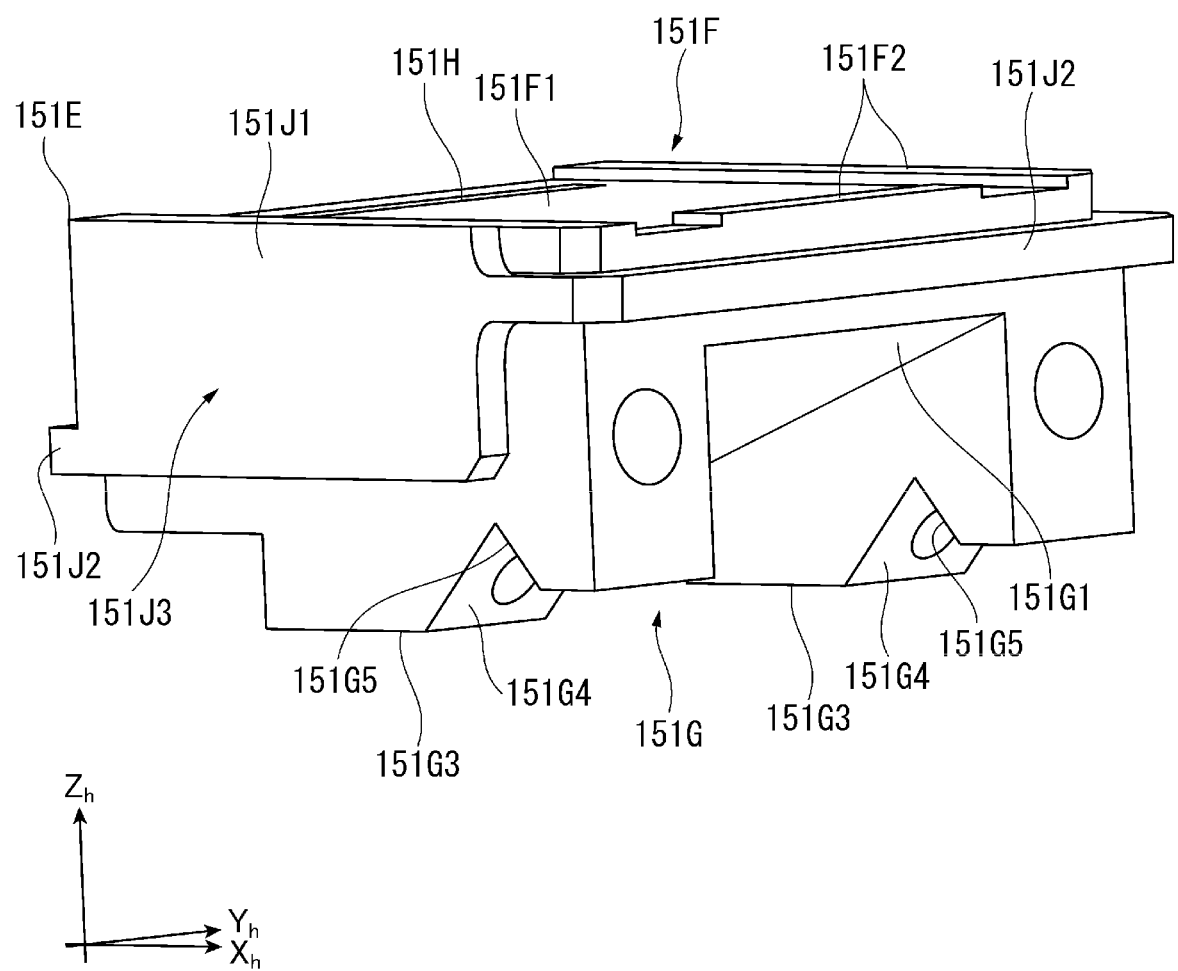
FIG. 27 is a perspective view showing a configuration of a transmission pedestal portion according to the modification example 5.

FIG. 27 is a perspective view showing the transmission pedestal portion 151E. FIG. 28 is a plan view showing the transmission pedestal portion 151E when viewed from a +Zh side.

The transmission pedestal portion 151E is a block-like member having a rectangular shape in plan view when viewed from the sensor center axis 15C, and has the tip end-side end portion 151F facing the reception unit and the proximal end-side end portion 151G opposite to the tip end-side end portion 151F.

A joint surface 151F1 (a third surface) that is perpendicular to the sensor center axis 15C is provided in the tip end-side end portion 151F. A transmission-side fixed surface 151B1 (a second surface) on an opposite side to the transmission surface 151C (a first surface) of the main transmission body unit 151B is joined to the joint surface 151F1.

Further, a plurality of step portions 151F2 for positioning the main transmission body unit 151B are provided at the tip end-side end portion 151F. For example, in an example illustrated in FIG. 28, the step portions 151F2 are provided at a ±Yh side and a −Xh side of the joint surface 151F1 and position the main transmission body unit 151B.

The proximal end-side end portion 151G has an inclined end surface 151G1 (a fourth surface), a connection surface 151G2, and a substrate joint portion 151G3.

The inclined end surface 151G1 is a surface, a normal line of which is inclined with respect to the sensor center axis 15C and is provided at a position where the inclined end surface 151G1 overlaps with the transmission surface 151C of the main transmission body unit 151B in a plan view when viewed along the sensor center axis 15C. In the present example, although an example is shown in which the inclined end surface 151G1 is inclined to the −Zh side as it goes to the +Xh side, an inclination direction of the inclined end surface 151G1 is not limited thereto, may be inclined in the −Zh direction as it goes to the +Yh side, and may be another inclination direction.

The connection surface 151G2 is a surface that continues from the inclined end surface 151G1 on the +Xh side of the inclined end surface 151G1. The transmission pedestal portion 151E is provided with a wiring hole 151H penetrated from the connection surface 151G2 to the joint surface 151F1, and a wire or an FPC connecting the main transmission body unit 151B and the transmission circuit board 31A is inserted through the wire hole 151H.

The pair of substrate joint portions 151G3 is provided at both ends of the inclination end surface 151G1 in the Yh direction with the inclination end surface 151G1 interposed therebetween. The substrate joint portions 151G3 are protrusion portions protruding from the inclination end surface 151G1 toward the −Zh side, and are provided with a substrate joint surface 151G4 which the transmission circuit substrate 31A is in contact with and a substrate holding unit 151G5 for positioning an end portion of the transmission circuit board 31A. In detail, the substrate joint surface 151G4 is a flat surface that is inclined with respect to the sensor center axis 15C, and is a flat surface that is substantially parallel to an extension direction of a wire cable 31A2 connected to the transmission circuit board 31A through a connector 31A1. Further, the substrate holding unit 151G5 is configured by a surface standing up in a direction that intersects the substrate joint surface 151G4.

As the transmission circuit board 31A is fixed to the substrate joint surface 151G4, even when the ultrasonic wave transmitted from the transmission-side fixed surface 151B1 of the main transmission body unit 151B to the transmission pedestal portion 151E side passes through the inclination end surface 151G1 along the sensor center axis 15C, and reaches the transmission circuit board 31A, the ultrasonic wave is reflected by the transmission circuit board 31A in a direction inclined with respect to the sensor center axis 15C. Therefore, the multiple reflection caused by reflecting the ultrasonic wave from the transmission circuit board 31A toward the sensor center axis 15C can be suppressed.

As illustrated in FIG. 28, the transmission pedestal portion 151E has a shape in which the tip end-side end portion 151F and a proximal end-side end portion 151G overlap with each other in a plan view when viewed from the Zh direction. That is, a dimension of the tip end-side end portion 151F in the Yh direction and a dimension from a +Yh side end surface of the substrate joint portion 151G3 on a +Yh side to a −Yh side end surface of the substrate joint portion 151G3 on a −Yh side are the same dimension, and substantially coincide with a dimension of a cylindrical inner circumferential surface of the first shielding unit 153D1 and the second shielding unit 153D2 in the Yh direction.

Further, a dimension of the tip end-side end portion 151F in the Xh direction and a dimension from an end edge of the inclination end surface 151G1 on the −Xh side to an end edge of the connection surface 151G2 on the +Xh side are the same dimension, and substantially coincide with dimensions of cylindrical inner circumferential surfaces of the first shielding unit 153D1 and the second shielding unit 153D2 in the Yh direction.

Thus, an exposure portion 151J1 protruding to the ±Yh side and a flange portion 151J2 protruding to a ±Xh side from a region where the tip end-side end portion 151F and the proximal end-side end portion 151G overlap with each other when viewed from the Zh direction are provided on a circumferential surface of the transmission pedestal portion 151E.

The exposure portion 151J1 protrudes from the region where the tip end-side end portion 151F and the proximal end-side end portion 151G overlap with each other when viewed from the Zh direction, by substantially the same dimension as the thickness of the first shielding portion 153D1 and the second shielding portion 153D2 in the Yh direction. This exposure portion 151J1 has an exposure surface 151J3 that is parallel to the XhZh plane. This exposure surface 151J3 comes into contact with a fixing portion for fixing the transmission unit 151D and disposed in the electronic device, so as to position the transmission unit 151D.

The flange portion 151J2 protrudes from the region where the tip end-side end portion 151F and the proximal end-side end portion 151G overlap with each other when viewed from the Zh direction, by substantially the same dimension as the thickness of the first shielding portion 153D1 and the second shielding portion 153D2 in the Xh direction.

The first shielding unit 153D1 is provided at the +Zh side of the transmission pedestal portion 151E, and an end portion of the first shielding unit 153D1 on the −Zh side is in contact with end surfaces of the exposure portion 151J1 and the flange portion 151J2 on the +Zh side. Accordingly, a part of the transmission pedestal portion 151E on the +Zh side, including the tip end-side end portion 151F to which the main transmission body unit 151B is fixed, is disposed in a cylindrical inner periphery of the first shielding unit 153D1.

Further, a first through-hole 153C1 along the sensor center axis 15C is provided at the −Zh side of the first shielding unit 153D1, and the transmission surface 151C of the main transmission body unit 151B is disposed to face the first through-hole 153C1.

A second through-hole 153C2 communicating with the first through-hole 153C1 is provided at an opening end of the first shielding unit 153D1 on the +Zh side. The second through-hole 153C2 is a hole having a first inclination center axis 15C1 inclined with respect to the sensor center axis 15C. The hole cross section of the second through-hole 153C2, which is perpendicular to the first inclination center axis 15C1, is larger than the hole cross section of the first through-hole 153C1, which is perpendicular to the sensor center axis 15C. A stepped surface 153C3 connecting an end edge of the first through-hole 153C1 and an end edge of the second through-hole 153C2 is provided between the first through-hole 153C1 and the second through-hole 153C2. The stepped surface 153C3 is a flat surface that is perpendicular to the first inclination center axis 15C1, and the protective member 154 is disposed in the stepped surface 153C3. Accordingly, the normal line of the protective member 154 is inclined with respect to the sensor center axis 15C.

Further, a cap 153E having a third through-hole 153E1 that is a through-hole along the sensor center axis 15C is fitted to an end surface of the first shielding unit 153D1 on the +Zh side. The cap 153E holds the protective member 154 with the protective member 154 interposed between the cap 153E and the stepped surface 153C3.

The second shielding unit 153D2 is provided at the −Zh side of the transmission pedestal portion 151E, and an end portion of the second shielding unit 153D2 on the +Zh side is in contact with end surfaces of the exposure portion 151J1 and the flange portion 151J2 on the −Zh side. Accordingly, a part of the transmission pedestal portion 151E on the −Zh side, including the proximal end-side end portion 151G, is disposed in a cylindrical inner periphery of the second shielding unit 153D2.

The second shielding unit 153D2 includes a first cylindrical portion 153D3, a central axis of which is the sensor center axis 15C and a second cylindrical portion 153D4, a central axis of which is the second inclination center axis 15C2 inclined with respect to the sensor center axis 15C.

The transmission pedestal portion 151E and the transmission circuit board 31A fixed to the transmission pedestal portion 151E are provided at a cylindrical inner peripheral side of the first cylindrical portion 153D3.

The wire cable 31A2 connected to the transmission circuit board 31A is disposed in the second cylindrical portion 153D4, and the wire cable 31A2 is drawn out from an opening end of the second cylindrical portion 153D4 on an opposite side to the first cylindrical portion 153D3.

In the transmission pedestal portion 151A according to the first embodiment, the proximal end-side end surface 151A1 is fixed to the transmission circuit board 31. However, the other components such as the transmission circuit board 31A are not joined to the inclination end surface of the transmission pedestal portion 151E according to the modification example 5. Therefore, the shape of the inclination end surface 151G1 is not limited to the flat surface illustrated in FIGS. 27 and 28.

Figure 29:
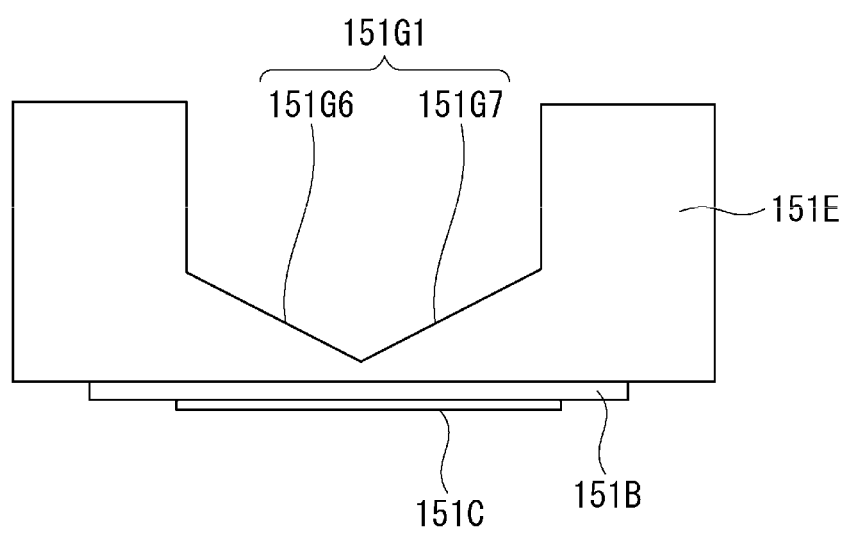
FIG. 29 is a schematic view showing another example of an inclined end surface of the transmission pedestal portion according to the modification example 5.

For example, as illustrated in FIGS. 29 and 30, the inclination end surface 151G1 of the transmission pedestal portion 151E may be bent.

As illustrated in FIG. 29, the inclination end surface 151G1 may be configured in a valley shape including a first inclination surface 151G6 inclined to the +Zh side as it goes from an end portion on the −Xh side toward the +Xh side and a second inclination surface 151G7 inclined to the +Zh side as it goes from an end portion on the +Xh side toward the −Xh side.

Further, as illustrated in FIG. 30, the inclination end surface 151G1 may be configured in a mountain shape including a third inclination surface 151G8 inclined to the −Zh side as it goes from the end portion on the −Xh side toward the +Xh side and a fourth inclination surface 151G9 inclined to the −Zh side as it goes from an end portion on the +Xh side toward the −Xh side.

In addition, the inclination end surface 151G1 may be curved in a cylindrical shape or a spherical shape or may be formed in a pyramidal shape.

Modification Example 6

In the first embodiment, the image scanner 10 is shown as an example of the electronic device. However, the present disclosure is not limited thereto. In a printing apparatus (a printer) provided with a printing head for printing an image on a printing paper sheet transported on the transport passage 130, when multi-feeding of the printing paper sheet is detected, the above-described ultrasonic sensors 15, 15A, 15B, 15D, 15E, 15F, and 15G may be applied.

Further, in such a printing apparatus, when the type of the printing paper sheet is determined, the ultrasonic sensors 15, 15A, 15B, 15D, 15E, 15F, and 15G may be used. That is, in the printing apparatus, a storage unit stores table data in which the reception intensity of the reception signal from the reception unit 152 and the type of the printing paper sheet are associated with each other. Thus, a controller (a computer) provided in the printing apparatus functions as a state detecting unit, and determines the type of the printing paper sheet corresponding to the reception signal from the reception unit 152. In this case, the printing apparatus can form an optimum image on the printing paper sheet according to the type of the printing paper sheet.

Further, an object to be printed is not limited to the paper sheet P and the printing paper sheet, and may be a film, a cloth, and the like as described above.

Further, in a flow rate measuring device for measuring a flow rate of a fluid flowing in a pipe or the like, the above-described ultrasonic sensors 15, 15A, 15B, 15D, 15E, 15F, and 15G may be applied. That is, when the ultrasonic wave is transmitted to the fluid that is the object to be printed, and the ultrasonic wave having passed through the fluid is received, the traveling direction of the ultrasonic wave is changed according to a flow rate of the fluid. At this time, as a change in the voltage value of the reception signal is detected, the flow rate of the fluid can be measured. In such a flow rate measuring device, in order to measure the flow rate of the fluid based on the change in the voltage of the reception signal, it is necessary to accurately point the sound axis of the ultrasonic wave transmitted from the transmission unit to the reception unit and to set a reference position. By using the above-described ultrasonic sensor, the reference position can be accurately set, and flow rate detection accuracy of the flow rate detecting device can be improved.

Further, in the above-described embodiment, the ultrasonic sensors 15, 15A, 15B, 15D, 15E, 15F, and 15G each including the transmission unit 151 that transmits the ultrasonic wave and the reception unit 152 that receives the ultrasonic wave are described as examples. In contrast, the ultrasonic device may be configured with only the transmission unit that transmits the ultrasonic wave or the ultrasonic device may be configured with only the reception unit that receives the ultrasonic wave.

For example, in the ultrasonic device such as a data transmitting device that transmits data through the ultrasonic wave, an insect eliminator or an animal eliminator that rejects insects and animals using the ultrasonic wave, and a tactile transmitting device using the ultrasonic wave for haptics, only the transmission unit may be provided. Further, in the ultrasonic device such as a data receiving device that receives an ultrasonic signal transmitted from the data transmitting device using the ultrasonic wave, only the reception unit may be provided.

In the ultrasonic device provided with only the transmission unit, when foreign substances adhere to the transmission surface of the transmission unit, transmission sensitivity decreases. Further, in the ultrasonic device provided with only the reception unit, when foreign substances adhere to the reception surface of the reception unit, reception sensitivity decreases. In contrast, as described above, as a mesh-like protective member is provided at a position separated by a predetermined distance from the transmission surface or the reception surface, entry of the foreign substance can be suppressed, a reduction in the transmission sensitivity of the transmission unit can be suppressed, and a reduction in the reception sensitivity of the reception unit can be suppressed.

Further, in the ultrasonic device provided with only the transmission unit, when the multiple reflection of the ultrasonic wave occurs, residual vibration affects accuracy of the ultrasonic wave transmitted at a next time. For example, in the data transmitting device that transmits data through the ultrasonic wave, data to be transmitted at a next time may not be correctly transmitted due to a residual signal. In contrast, as in the above-described embodiment, when the protective member is configured to be inclined with respect to the normal line of the transmission surface, the multiple reflection can be effectively suppressed, so that influence of the residual signal can be suppressed.

Further, although an example of the ultrasonic device in which the transmission unit and the reception unit are separately provided has been described, one transmission and reception unit that performs transmission and reception processing of the ultrasonic wave may be provided. In this case, the ultrasonic wave according to an object to be measured is transmitted from the transmission and reception unit, and the reflected ultrasonic wave reflected by the object to be measured and returning to the transmission and reception unit is received. In this case, a distance measuring sensor that measures a distance from the ultrasonic sensor to the object to be measured, based on a period of time from a timing when the transmission and reception unit transmits the ultrasonic wave to a timing when the transmission and reception unit receives the reflected ultrasonic wave, can be used.

In addition, a detailed structure according to an embodiment of the present disclosure can be configured by properly combining the embodiments and modifications without departing from the spirit of the present disclosure, and may be configured by properly changing another structure.

What is claimed is:

1. An ultrasonic device comprising:
an ultrasonic element that performs at least one of transmitting an ultrasonic wave along a first axis and receiving the ultrasonic wave input along the first axis;
a protective member that is provided on the first axis and covers the ultrasonic element; and
a shielding unit, wherein
the protective member has a plurality of pores through which the ultrasonic wave traveling along the first axis passes,
the ultrasonic element is disposed to be surrounded by an inner peripheral surface of the shielding unit,
the shielding unit has a through-hole through which the ultrasonic wave passes, and
the protective member is provided to cover the through-hole of the shielding unit.

2. The ultrasonic device according to claim 1, wherein
the shielding unit has a substantially cylindrical shape having the first axis as a central axis, and
the shielding unit extends along the first axis from a position where the shielding unit surrounds the ultrasonic element.

3. The ultrasonic device according to claim 1, wherein
a sound absorbing unit surrounding the through-hole is provided on a surface of the extension tip end portion of the shielding unit, which is opposite to the ultrasonic element.

4. An ultrasonic device comprising:
an ultrasonic element that performs at least one of transmitting an ultrasonic wave along a first axis and receiving the ultrasonic wave input along the first axis; and
a protective member that is provided on the first axis and covers the ultrasonic element, wherein
the protective member has a plurality of pores through which the ultrasonic wave traveling along the first axis passes,
the protective member is configured by arranging a plurality of wires along a first direction intersecting the first axis and a second direction intersecting the first axis and the first direction, and
a normal line of a plane including the first direction and the second direction is inclined with respect to the first axis.

5. The ultrasonic device according to claim 4, wherein
the normal line of the plane including the first direction and the second direction is inclined at an angle of 5° or more with respect to the first axis.

6. The ultrasonic device according to claim 4, wherein
the ultrasonic element performs at least one of transmitting the ultrasonic wave toward an object and receiving the ultrasonic wave input from the object,
the first axis is inclined at a first angle with respect to a normal line of the object, and
the normal line of the plane including the first direction and the second direction is inclined at a second angle that is different from the first angle with respect to the normal line of the object.

7. An ultrasonic device comprising:
an ultrasonic element that performs at least one of transmitting an ultrasonic wave along a first axis and receiving the ultrasonic wave input along the first axis; and
a protective member that is provided on the first axis and covers the ultrasonic element, wherein
the protective member has a plurality of pores through which the ultrasonic wave traveling along the first axis passes,
the ultrasonic element has a first surface through which the ultrasonic wave is transmitted or received and a second surface that is opposite to the first surface,
the ultrasonic device further comprises a pedestal portion that holds the ultrasonic element, the pedestal portion includes a third surface which is perpendicular to the first axis and to which the second surface of the ultrasonic element is joined, and a fourth surface provided at an opposite side to the third surface, and a normal line of the fourth surface is inclined with respect to the first axis.

8. The ultrasonic device according to claim 7, wherein the normal line of the fourth surface is inclined at an angle of 5° or more with respect to the first axis.

9. The ultrasonic device according to claim 1, wherein a pair of the ultrasonic elements is provided, and one of the pair of ultrasonic elements is a transmission unit that transmits the ultrasonic wave and the other of the pair of ultrasonic elements is a reception unit that receives the ultrasonic wave, and the transmission unit and the reception unit are provided to face each other on the first axis.

10. The ultrasonic device according to claim 1, wherein the ultrasonic element receives the ultrasonic wave from the object to output a reception signal, and the ultrasonic device further comprises a state detecting unit that detects a state of the object based on the reception signal.

\* \* \* \* \*